US009628873B2

(12) United States Patent
Hu et al.

(10) Patent No.: US 9,628,873 B2
(45) Date of Patent: Apr. 18, 2017

(54) METHODS AND SYSTEMS FOR IDENTIFYING A MEDIA PROGRAM CLIP ASSOCIATED WITH A TRENDING TOPIC

(71) Applicant: Verizon Patent and Licensing Inc., Arlington, VA (US)

(72) Inventors: Si Ying Diana Hu, Sunnyvale, CA (US); Suri B. Medapati, San Jose, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 287 days.

(21) Appl. No.: 14/478,156

(22) Filed: Sep. 5, 2014

(65) Prior Publication Data

US 2016/0073166 A1    Mar. 10, 2016

(51) Int. Cl.
*G06F 17/30* (2006.01)
*H04N 21/845* (2011.01)
*H04N 21/8352* (2011.01)
*H04N 21/8405* (2011.01)
*H04N 21/8549* (2011.01)
*H04N 5/765* (2006.01)
*H04N 21/25* (2011.01)
*H04N 21/258* (2011.01)

(52) U.S. Cl.
CPC ... *H04N 21/8456* (2013.01); *G06F 17/30038* (2013.01); *G06F 17/30353* (2013.01); *H04N 5/765* (2013.01); *H04N 21/252* (2013.01); *H04N 21/25891* (2013.01); *H04N 21/8352* (2013.01); *H04N 21/8405* (2013.01); *H04N 21/8549* (2013.01)

(58) Field of Classification Search
None
See application file for complete search history.

(56) References Cited

U.S. PATENT DOCUMENTS

| | | | | |
|---|---|---|---|---|
| 9,277,234 | B1 * | 3/2016 | Whillock | H04N 19/44 |
| 2004/0215736 | A1 * | 10/2004 | Kortan | H04L 12/587 |
| | | | | 709/207 |
| 2014/0074866 | A1 * | 3/2014 | Shah | G06F 17/30817 |
| | | | | 707/749 |
| 2015/0296228 | A1 * | 10/2015 | Chen | G06F 17/30029 |
| | | | | 725/34 |

OTHER PUBLICATIONS

Boxfish, What We Do, 5 pages, http://boxfish.com/what, as accessed on Jun. 27, 2014.

* cited by examiner

*Primary Examiner* — Wilson Lee

(57) ABSTRACT

An exemplary method of identifying a media program clip associated with a trending topic includes receiving a plurality of media content streams representative of a plurality of media programs, detecting, while the media content streams are being received, caption data included in the media content streams and associated with the media programs, identifying, based on the detected caption data, a trending topic associated with the plurality of media programs, and identifying a media program clip associated with the trending topic. Corresponding systems and methods are also described.

21 Claims, 18 Drawing Sheets

METHODS AND SYSTEMS FOR IDENTIFYING A MEDIA PROGRAM CLIP ASSOCIATED WITH A TRENDING TOPIC

BACKGROUND INFORMATION

Advances in electronic communications technologies have interconnected people and allowed for distribution of information perhaps better and faster than ever before. To illustrate, personal computers, handheld devices, mobile phones, set-top box devices, and other electronic access devices are increasingly being used to access, store, download, share, and/or otherwise process various types of media content (e.g., video, audio, photographs, and/or multimedia).

However, it has become more difficult for users to locate media content that actually interests the users. It has become especially difficult for users to efficiently locate and access media content about trending topics (e.g., current events, news, subjects currently being discussed more than other subjects, etc.). For example, in current implementations, social media applications and platforms have a large amount of trivial and often frivolous information that a user must sift through in order to locate information about trending topics or topics of interest to the user. In addition, the number of media content choices available to users by way of set-top box devices and other types of media content processing devices has seen enormous growth, making it more difficult to identify and locate relevant media content. Moreover, trending topics are often discussed in media programs, such as news programming and talk shows, for only small amounts of time, and program guides often provide little or no detail about specific topics to be discussed during a program. As a result, a user may not be able to efficiently identify trending topics or locate media content related to trending topics by the use of traditional methods, such as channel surfing or referring to program guides.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
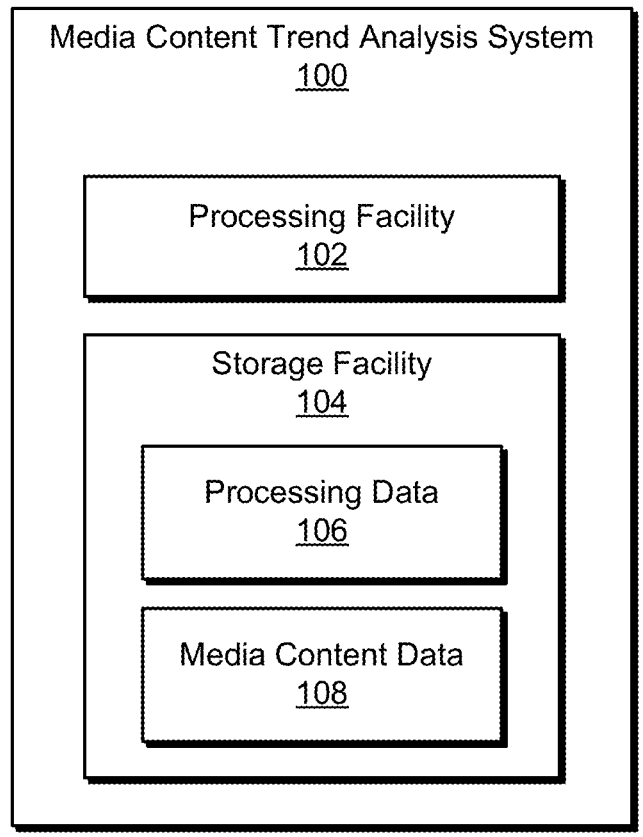
FIG. 1 illustrates an exemplary media content trend analysis system according to principles described herein.

Methods and systems for identifying a trending topic and identifying a media program clip associated with the trending topic are described herein. As will be described below, a media content trend analysis system may receive a plurality of media content streams representative of a plurality of media programs and, while the media content streams are being received, detect caption data included in the media content streams and associated with the media programs. Based on the detected caption data, the media content trend analysis system may identify a trending topic. The media content trend analysis system may then identify a media program clip associated with (e.g., that mentions, discusses, explores, explains, analyzes, presents graphics related to, etc.) the trending topic. In some examples, the media content trend analysis system may also recommend the media program clip for access by a user.

As used herein, a "trending topic" may refer to any topic that is a subject of (e.g., mentioned in/by, discussed in/by, explored in/by, explained in/by, analyzed in/by, presented in/by, and the like) one or more media programs, or parts of one or more media programs, generally more so (e.g., more frequently, more in depth, for longer periods of time, on more media content channels, etc.) than other topics. A trending topic may be representative of, for example, a person (e.g., a celebrity, athlete, actor, political figure), an entity (e.g., a business, sports team, political party, government, country), a recent or current event (e.g., news item, political event, sporting event, high-profile lawsuit, natural disaster), a brand (e.g., a company, a product, etc.) and the like. A trending topic may include a currently trending topic (i.e., a topic that is trending in media programs that are currently being broadcast or otherwise presented). Additionally or alternatively, the trending topic may include a previously trending topic (i.e., a topic that was trending during a past time period (e.g., three days prior to a current time during which media programs are being currently broadcast or otherwise presented)).

As will be described below, in some examples the media content trend analysis system may identify a trending topic by detecting one or more keywords included in caption data included in the plurality of media content streams and performing a text analysis (e.g., keyword clustering) on the detected keywords. The media content trend analysis system may then identify a media program clip that is associated with the trending topic. For instance, the media content trend analysis system may identify the media program clip by analyzing caption data included in a media content stream associated with a media program and detecting that one or more keywords included in the caption data are associated with the trending topic, such as by applying a text analysis rule to the one or more detected keywords. The media content trend analysis system may then use timestamps associated with the detected one or more keywords to determine a start point and an end point of the media program clip. Thus, the media program clip includes content associated with the trending topic.

In certain examples, an identified media program clip may be included in a media content stream that is included in the plurality of media content streams that are analyzed to identify the trending topic. For instance, the media program may be included in a media content stream currently being received, and thus the media content trend analysis system may identify and recommend, in real-time, a media program clip that is currently broadcasting. In other examples, the media program clip may be included in a media content stream that was received by the system before the system receives the plurality of media content streams that are analyzed to identify the trending topic. For instance, the system may identify and recommend a media program clip that has been previously recorded to a local storage facility or to a network storage facility, such as in a cloud-based DVR service.

The media content trend analysis system may recommend an identified media program clip associated with a trending topic. Through such a recommendation, the methods and systems described herein may facilitate a user quickly, efficiently, and accurately identifying and locating portions of media programs that are associated with the trending topic. Furthermore, the methods and systems described herein may eliminate, or at least reduce, the need for a user to sift through trivial and irrelevant content and information in order to locate content and information associated with a trending topic. At the same time, the methods and systems described herein may monitor hundreds or more media content channels, thereby providing a large window into trending topics and enabling identification of trending topics by utilizing algorithms that analyze popularity of media programs, topic clustering, and the like. Additionally, the time required for natural language processing of caption data included in the media content streams is highly scalable, thus allowing trending topics to be identified practically in real-time across hundreds of media content channels.

Figure 2:
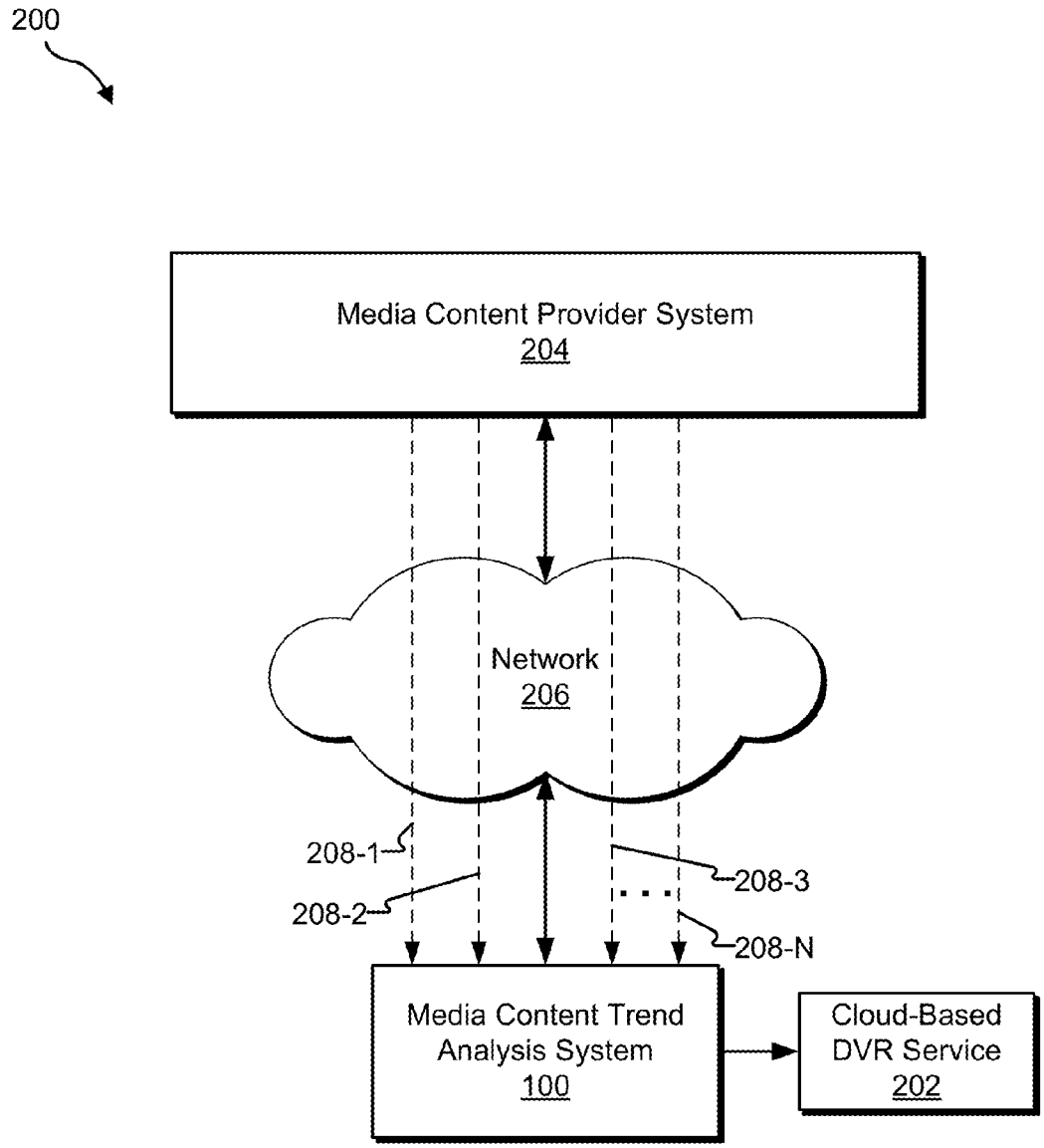
FIG. 2 shows an exemplary configuration in which the system of FIG. 1 provides a cloud-based digital video recording ("DVR") service according to principles described herein.

FIG. 1 illustrates an exemplary media content trend analysis system 100 ("system 100"). In some examples, system 100 may be associated with (e.g., provided by, maintained by, and/or used by) a provider of a cloud-based DVR service. For example, FIG. 2 shows an exemplary configuration 200 in which system 100 provides a cloud-based DVR service 202, which may include any of the cloud-based DVR services described herein. Cloud-based DVR service 202 may include, for example, a network DVR service that provides virtually unlimited storage capabilities for users of the network DVR service by remotely recording and storing copies of media content (e.g., within one or more network-based servers maintained by a provider of the network DVR service) in response to requests by users to record the media content. The network DVR service may subsequently receive a request provided by a user to play back the recorded media content by way of a local computing device (e.g., a set-top box device, a mobile computing device, etc.), and, in response, provide (e.g., stream) one of the copies of the media content to the local computing device in order to facilitate playback of the recorded media content by the local computing device.

Cloud-based DVR service 202 may additionally or alternatively include a "catch up" television service that may automatically record all television programming broadcasts by way of one or more television channels (e.g., within one or more network-based servers maintained by a provider of the catch up television service). The television programming may be available for subsequent network access by users of the catch up television service for a predetermined number of days (e.g., a week) after it is recorded. In this manner, users do not have to manually select television programs that they would like to record.

While FIG. 2 shows system 100 providing cloud-based DVR service 202, it will be recognized that in some alternative embodiments, system 100 does not provide cloud-based DVR service 202. In these alternative embodiments, cloud-based DVR service 202 may be provided by a separate system and/or entity or not provided at all.

As shown in FIG. 2, system 100 may be communicatively coupled to a media content provider system 204 by way of a network 206. Network 206 may include one or more networks, such as one or more cable networks, subscriber television networks, wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and/or any other network(s) capable of carrying data and/or communications signals between media content provider system 204 and system 100.

System 100 and media content provider system 204 may communicate using any communication platforms and technologies suitable for transporting data (e.g., media content streams) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Long Term Evolution ("LTE") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

Media content provider system 204 may be associated with a service provider (e.g., a subscriber television service provider, an Internet service provider, etc.), a media content program provider (e.g., ESPN, NBC, etc.), and/or any other type of media content provider. Accordingly, media content provider system 204 may be configured to provide one or more media content services (e.g., television services, video-on-demand services, Internet services, application services, etc.). For example, media content provider system 204 may be configured to manage (e.g., maintain, process, distribute, and/or generate) media content (e.g., media content programs, advertisements, etc.) configured to be delivered to media content processing devices by way of media content channels. Media content provider system 204 may be implemented by one or more computing devices as may serve a particular implementation.

As shown, media content provider system 204 may provide a plurality of media content streams 208 (e.g., media content streams 208-1 through 208-N), which may be received by system 100 by way of network 206 in any suitable manner. In some examples, the media content streams 208 may be provided by way of a plurality of different media content channels. Exemplary media content streams 208 will be described in more detail below.

System 100 may process the media content streams 208 in any of the ways described herein and may utilize the media content streams 208 to provide the cloud-based DVR service 202. Users (e.g., subscribers) may access the cloud-based DVR service 202 in any suitable manner. For example, users may access the cloud-based DVR service 202 by providing one or more requests to access one or more media programs included in media content streams 208. As used herein, a "media program" may include a television program, on-demand media program, pay-per-view media program, broadcast media program (e.g., broadcast television program), multicast media program (e.g., multicast television program), narrowcast media program (e.g., narrowcast video-on-demand program), IPTV media program, video, movie, audio program, radio program, and/or any other media content instance that may be presented by way of a media content processing device (e.g., a set-top box device, a television device, a computing device, etc.).

Figure 3:
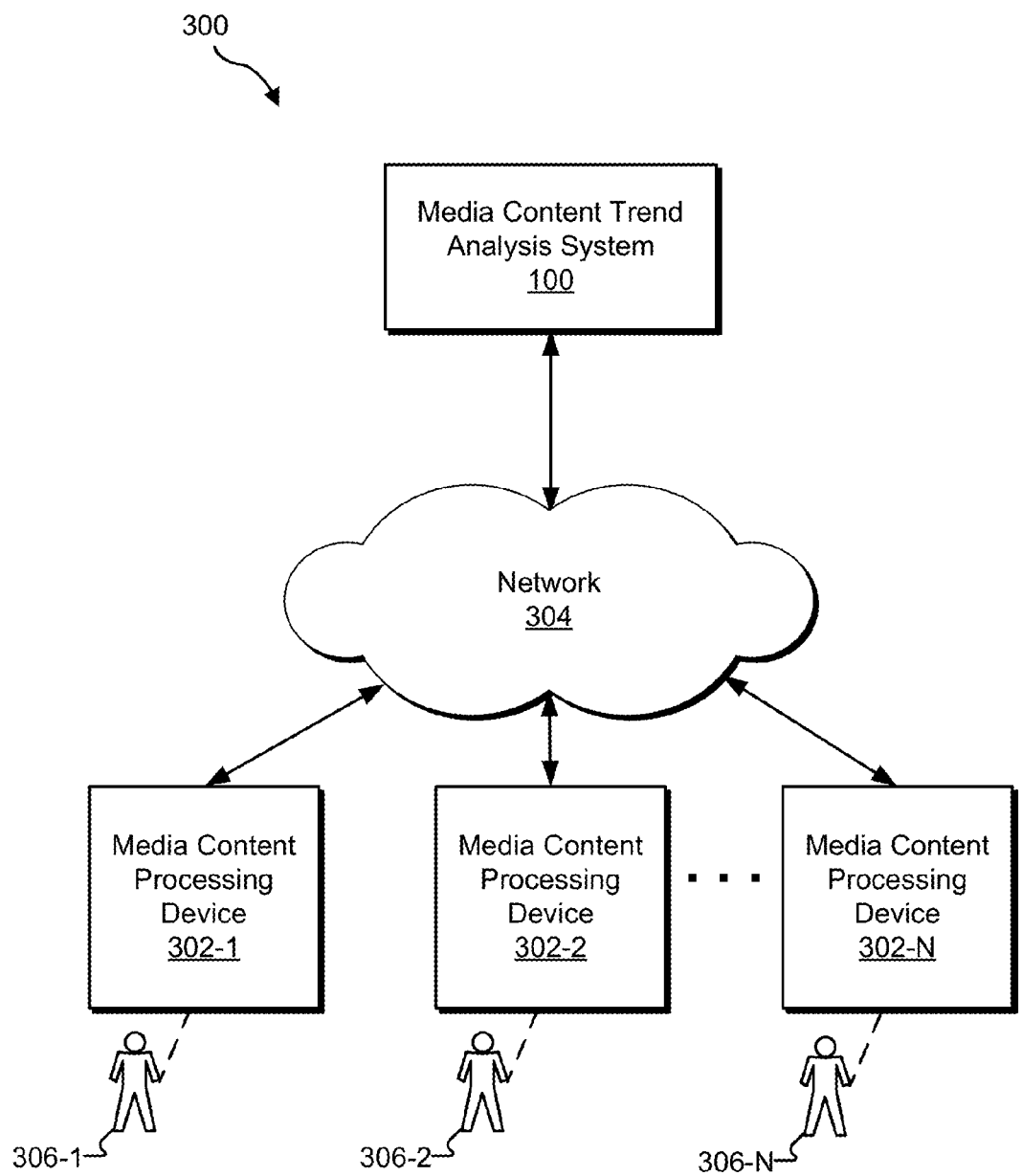
FIG. 3 shows an exemplary configuration in which users may access a cloud-based DVR service by way of media content processing devices according to principles described herein.

To illustrate, FIG. 3 shows an exemplary configuration 300 in which users may access cloud-based DVR service 202 by way of media content processing devices. As shown, a plurality of media content processing devices 302 (e.g., media content processing devices 302-1 through 302-N) are communicatively coupled to system 100 by way of a network 304 (which may include any of the networks described herein). Each media content processing device 302 may be implemented by any device configured to process (e.g., receive, present, and/or play back) media content. For example, each media content processing device 302 may be implemented by a set-top box device, a DVR device, a television device, a gaming console, a media player computing device (e.g., a media disc player device such as a digital video disc ("DVD") or BLUERAY DISC ("BD") player device), a computer, a mobile device (e.g., a tablet computer or a smart phone device), and/or any other computing device as may serve a particular implementation.

As shown, each media content processing device 302 is associated with (e.g., used by) a user 306 (e.g., users 306-1 through 306-N). Each user 306 may provide system 100 with a request to access media content recorded and maintained by system 100 in any suitable manner. In response to such a request, system 100 may provide the user 306 with access to the requested media content by way of one or more of the media content processing devices 302. For example, user 306-1 may provide a request to play back a media program recorded and maintained by system 100 in accordance with the cloud-based DVR service 202. In response, system 100 may provide (e.g., stream) one or more media content blocks associated with (i.e., including) the media program to media content processing device 302-1. Media content processing device 302-1 may use the one or more media content blocks to play back the media program (and, in some cases, one or more advertisement breaks associated with the media program).

Returning to FIG. 1, system 100 may include various components that facilitate identification of a trending topic based on the content and/or context of a plurality of media programs and identification of a media program clip based on the identified trending topic. To this end, system 100 may include, without limitation, a processing facility 102 and a storage facility 104. Facilities 102 and 104 may be communicatively coupled to one another by any suitable communication technologies.

It will be recognized that although facilities 102 and 104 are shown to be separate facilities in FIG. 1, facilities 102 and 104 may be combined into a single facility or split into additional facilities as may serve a particular implementation. Additionally or alternatively, one or more of the facilities 102 and 104 may be omitted from and external to media content management system 100 in other implementations. For example, storage facility 104 may be external of, and communicatively coupled to, system 100 in certain alternative implementations. Facilities 102 and 104 may include or be otherwise implemented by one or more computing devices configured to perform one or more of the operations described herein. In such implementations, system 100 may be referred to as a computer-implemented system 100.

Storage facility 104 may store processing data 106 (e.g., data generated and/or used by processing facility 102) and media content data 108 (e.g., data representative of recorded media content). Storage facility 104 may maintain additional or alternative data as may serve a particular implementation.

Processing facility 102 may perform one or more processing operations with respect to a plurality of media content streams (e.g., media content streams 208) provided by a media content provider system (e.g., media content provider system 204). For example, processing facility 102 may receive a plurality of media content streams representative of a plurality of media programs. Processing facility 102 may receive the plurality of media content streams in any suitable manner. For example, processing facility 102 may receive the media content streams as described above in connection with FIG. 2. In some examples, processing facility 102 receives the media content streams by way of a plurality of media content channels while the media programs are being broadcast or otherwise provided for presentation.

In some examples, processing facility 102 may record the media content streams as they are being received. The media content streams may be recorded to a network storage facility (e.g., a network storage facility associated with a cloud-based DVR service) and/or a local storage facility (e.g., a storage device included within a local media content processing device).

Figure 4:
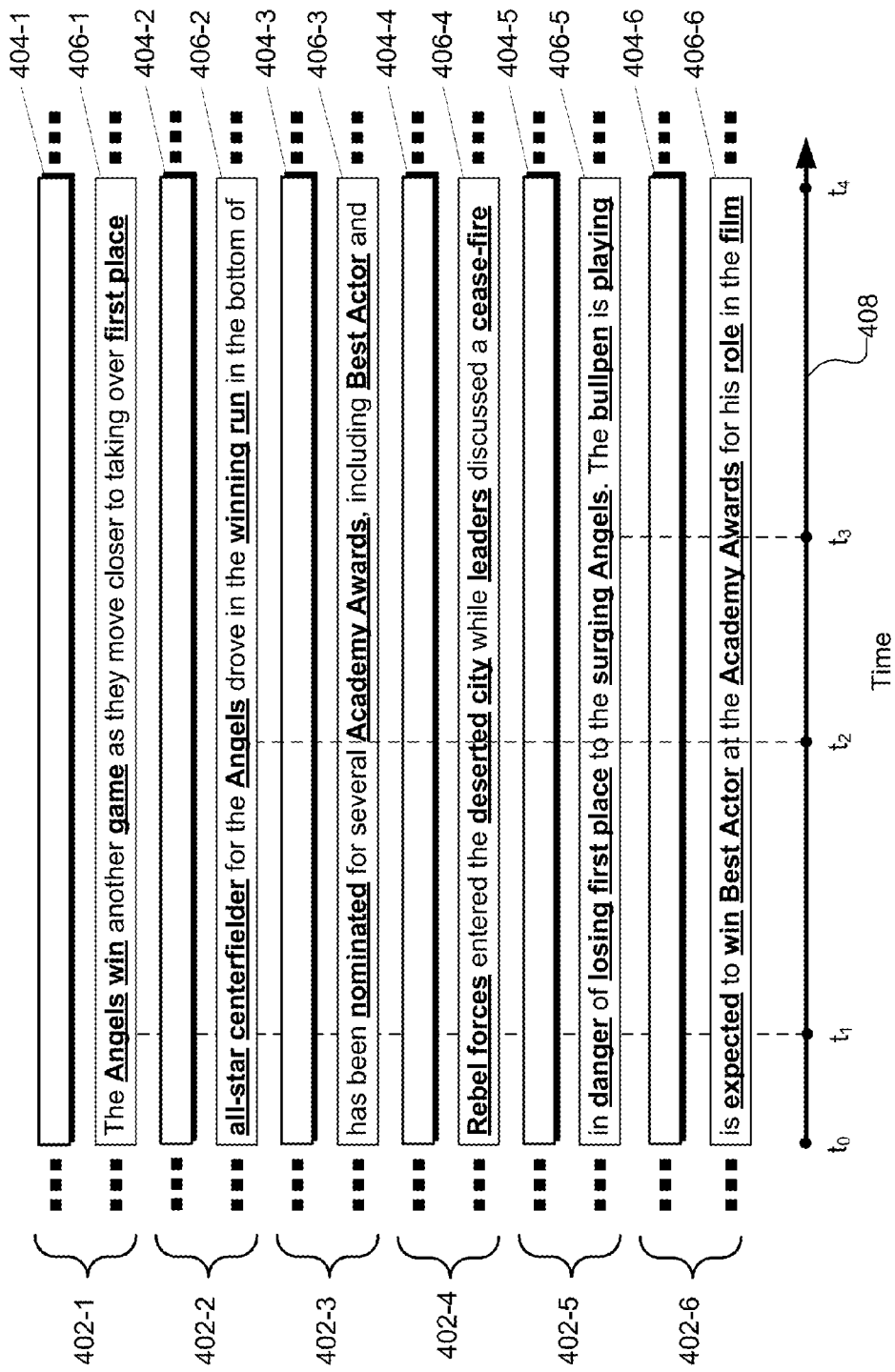
FIG. 4 illustrates examples of a plurality of media content streams according to principles described herein.

FIG. 4 illustrates exemplary media content streams 402 (e.g., media content streams 402-1 through 402-6) that may be received by processing facility 102 from a media content provider system (e.g., media content provider system 204). As shown, media content streams 402 each include data representative of media programs 404 (e.g., media programs 404-1 through 404-6) and caption data 406 (e.g., caption data 406-1 through 406-6) corresponding to each media program 404 temporally aligned along a time axis 408. In other words, as data representative of media programs 404 are transmitted to processing facility 102 via a plurality of different media content channels, temporally aligned caption data 406 is also received by processing facility 102 via the different media content channels. While the media content streams 402 are being received, processing facility 102 may detect the caption data 406 included in the media content streams 402. In some alternative examples, caption data 406 is not included within media content streams 402. In these alternative examples, caption data 406 may be received independently (e.g., from a source other than a media content provider system).

Processing facility 102 may identify a trending topic based on the detected caption data 406. For example, processing facility 102 may analyze the content of caption data 406 included in the plurality of media content streams 402 to identify, based on the caption data 406, a trending topic associated with the plurality of media programs 404.

Processing facility 102 may identify a trending topic based on the detected caption data 406 in any suitable manner. For example, processing facility 102 may identify a trending topic by detecting, within a predetermined time period, one or more keywords included in caption data 406 and identifying the trending topic based on the one or more keywords (e.g., by performing text analysis processing on the detected one or more keywords). The one or more keywords may be any words included within caption data 406. In some examples, processing facility 102 may ignore or remove one or more words (e.g., noise words, stop words, numbers, etc.) from the caption data 406 to obtain the one or more keywords.

To illustrate, FIG. 4 shows that processing facility 102 detects, within a predetermined time period ranging from time $t_0$ to time $t_4$, multiple keywords (shown in bold and underline) included in caption data 406, which keywords do not include certain noise words. Processing facility 102 may determine that a particular keyword occurs within the predetermined time period by detecting a timestamp for each keyword. For example, as indicated by the vertical dashed lines, the keyword "Angels" occurs at times $t_1$, $t_2$, and $t_3$, all of which are within the predetermined time period defined by times $t_0$ and $t_4$.

Processing facility 102 may identify a trending topic based on the detected keywords in any suitable manner. For example, processing facility 102 may perform text analysis processing on the detected keywords to determine the trending topic. The text analysis processing may include any suitable type of processing, such as keyword frequency counting, keyword clustering, applying a topic detection model (e.g., latent semantic analysis ("LSA"), probabilistic latent semantic analysis ("PLSA"), latent Dirichlet allocation ("LDA"), Pachinko allocation, etc.), contextual analysis, etc.

As an example, processing facility 102 may determine the trending topic based on a keyword frequency count of the detected keywords. To illustrate, processing facility 102 may count the number of occurrences of each keyword included in caption data 406 received by processing facility 102 across all or a portion of all media content channels during the predetermined time period. A trending topic may be identified when the keyword frequency count is equal to or exceeds a predetermined threshold. The predetermined threshold may be set by a user, may be predefined, or may be based on a predefined algorithm, which may take into account the relative frequency of other detected keywords.

To illustrate, with respect to the example provided in FIG. 4, processing facility 102 may perform a keyword frequency count to determine that the keyword "Angels" occurs three times during the predetermined time period, and that the keywords "Academy Awards" and "Best Actor" both occur twice during the predetermined time period. If the predetermined threshold is two, processing facility 102 may identify all three keywords as trending topics.

As an additional or alternative example, a trending topic may be identified based on a context of one or more detected keywords. The context may be determined in any suitable manner. In some examples, the context may be determined based on a similarity and/or relationship among multiple keywords included in the caption data 406, based on parts of speech of detected keywords, and/or based on name or topic recognition. For instance, the keyword "Angels," when detected in proximity to the keyword "game" or "all-star," may indicate that a context of the keyword "Angels" is baseball. Thus, processing facility 102 may identify baseball as a context associated with the keyword "Angels." Additionally or alternatively, processing facility 102 may identify the word "baseball," or any other words or names related to or associated with baseball, as the trending topic. In some examples, storage facility 104 may maintain a keyword relationship database that includes associated or related keywords, algorithms, and/or rules for determining a context of one or more keywords.

In additional or alternative examples, the context of a detected keyword may be determined based on any other attributes or metadata associated with the media content stream 402 (e.g., attributes of the media program 404 and/or of the caption data 406 in which the keyword is included). For example, the context of a detected keyword may be determined based on an attribute (e.g., a genre) of a media content channel of the media program 404 associated with the detected keyword, a broadcast time of the media program 404, a name of a person (e.g., an actor, director, celebrity, etc.) and/or any other metadata included in the media content stream or otherwise associated with the media program 404 (e.g., electronic program guide data).

In some examples, processing facility 102 may further identify, or filter out, trending topics by comparing detected caption data, one or more keywords included in the detected caption data, and/or identified trending topics with data or information from one or more independent information sources (e.g., sources of information that are not based on or related to the media content streams received by processing facility 102). For example, processing facility 102 may identify a trending topic based on information and/or data obtained from a social media service. For instance, processing facility 102 may identify a trending topic based on the media content streams received by processing facility 102, may further identify, such as in any of the manners described herein, a trending topic based on data obtained from a social media service (e.g., Twitter, Facebook, etc.), and compare the identified trending topics. Processing facility 102 may exclude or ignore any trending topics that are not also included in the trending topics based on the social media. Additionally or alternatively, textual data obtained from a social media service may be included in the text analysis processing. In some examples, the independent information sources may be one or more knowledge graphs built using data or information from the media content streams received by processing facility 102, from one or more search engines, and/or from one or more social media services, and/or may be one or more existing knowledge bases (e.g., Wikipedia, Freebase, etc.). Additionally or alternatively, contextual data obtained from a current television programming guide may also be included in the text analysis processing.

In some examples, processing facility 102 may ignore, filter out, or prevent identification of "noise" topics (e.g., trending topics that do not reflect actual trends). For example, processing facility 102 may further identify a trending topic based on actual real-time viewership. For instance, processing facility 102 may identify a trending topic based only on detected caption data received by way of media content channels having a number of actual, real-time viewers that meets or exceeds a predetermined threshold. In other examples, processing facility 102 may filter out and exclude trending topics based on a time decay of the trending topics. For instance, processing facility may score a trending topic according to one or more features of the trending topic that are indicative of the popularity of the trending topic, such as a frequency of keyword or topic mentions, total presentation time associated with the trending topic, and/or number of media content channels on which the trending topic is presented. The trending topic may be filtered or excluded as a "noise" topic when, for example, its score passes below a certain threshold, remains below a certain threshold for a predetermined amount of time, or continues decreasing for a predetermined amount of time (i.e., has passed its peak popularity).

In certain examples, processing facility 102 may further identify the trending topic based on one or more filters in addition to the detected keywords and/or detected context. In some examples, processing facility 102 may be configured to facilitate creation by a user of one or more filter rules configured to govern identification, by processing facility 102, of the trending topic. For instance, a user may specify that processing facility 102 monitor only caption data associated with media programs provided by way of a particular media content channel or set of media content channels. To illustrate, a user may specify, for example, a set of particular media content channels in which the user is interested (e.g., sports channels, news channels, or movie channels), the channels that the user receives in accordance with a media content service subscription, or all channels having a certain popularity rating.

In additional or alternative examples, a filter rule may be based on one or more metadata values associated with media programs. To illustrate, a user may specify that processing facility 102 identify only trending topics associated with certain types of media programs (e.g., news programs, movies, videos on demand, sports programming, etc.), certain genres (e.g., action, romance, etc.), featuring specific personnel (e.g., actors, producers, directors, etc.), having a particular video quality (e.g., high definition), having a certain (or minimum) popularity rating, and/or having any other attribute that may be specified by metadata. In this way, a user may configure system 100 to identify trending topics in which the user might be interested.

In further examples, processing facility 102 may further identify the trending topic based on one or more attributes associated with a user profile. For example, a user profile may be associated with any of the filters described herein, user preferences, and/or the user's viewing history.

While processing facility 102 may identify a trending topic using any of the above described methods, it may also utilize a combination of any of the above described methods, thus resulting in an accurate identification of discrete trending topics with a high level of granularity.

As indicated above, processing facility 102 may identify a trending topic of a predetermined time period. The predetermined time period may be any time period from which keywords may be obtained in order to identify a trending topic that is or was trending during the predetermined time period. The predetermined time period may be any time period as may suit a particular implementation.

Figure 5:
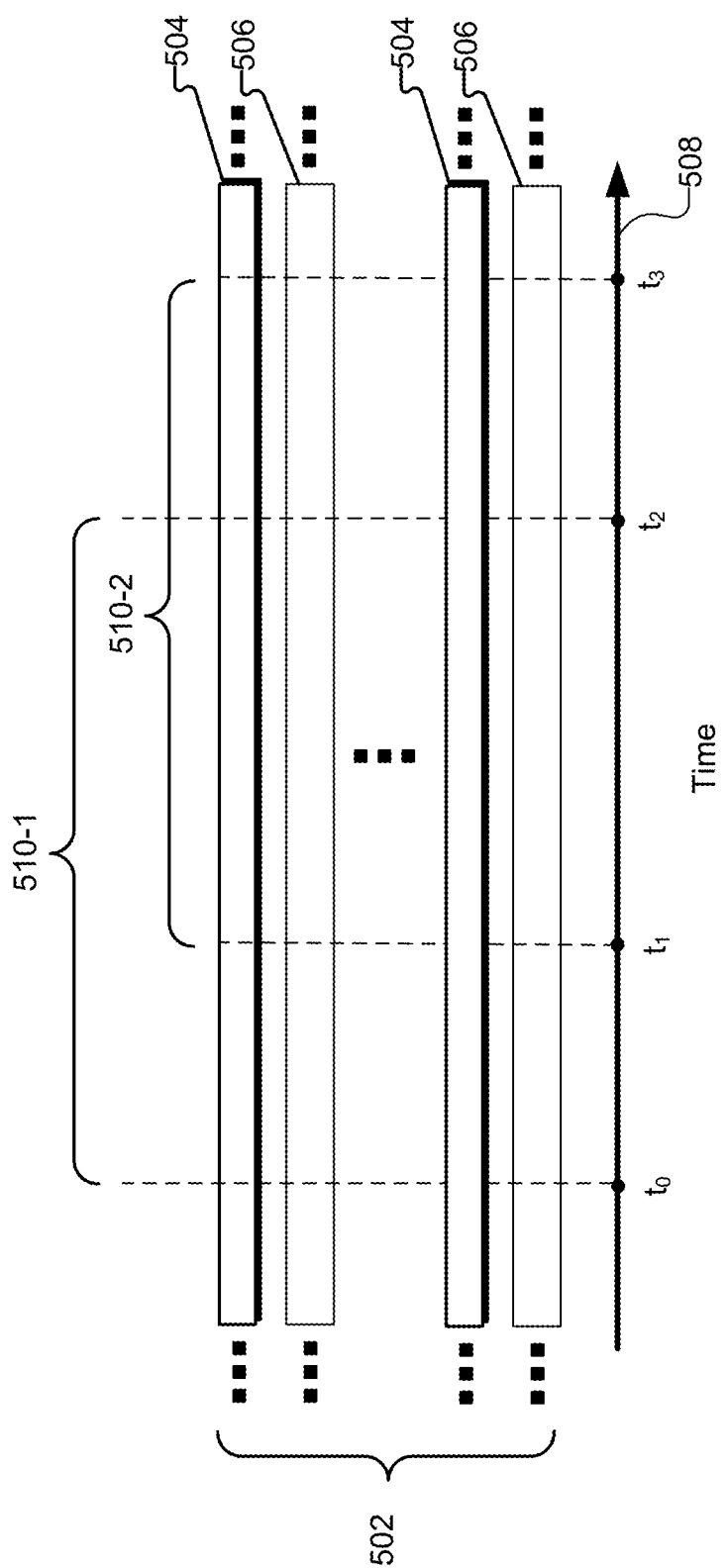
FIG. 5 illustrates an exemplary time period for identifying a trending topic associated with a plurality of media content streams according to principles described herein.

In certain examples, the predetermined time period may be a most recent time period, i.e., a predetermined time range immediately preceding a current time. A current time may be a time when system 100 is receiving the plurality of media content streams. FIG. 5 illustrates an exemplary plurality of media content streams 502 in which the predetermined time period is a most recent time period. As shown, a plurality of media content streams 502 includes a plurality of media programs 504 and caption data 506 associated with the plurality of media programs 504 temporally aligned along a time axis 508. In the example of FIG. 5, each of predetermined time periods 510 (e.g., predetermined time periods 510-1 and 510-2) has a set duration that immediately precedes the current time. For instance, as shown in FIG. 5, when the current time is time $t_2$, system 100 detects one or more keywords included in caption data 506 during the predetermined time period 510-1 that begins with time $t_0$ and ends with current time $t_2$. When the current time has progressed to time $t_3$, system 100 detects one or more keywords included in caption data 506 during the predetermined period 510-2 that begins with time $t_1$ and ends with current time $t_3$. The duration of a predetermined time period 510 may have any duration of time as may suit a particular implementation. For instance, the duration may be set to several hours or a day, or may be set to a more granular level, such as a few minutes. In certain examples, the duration of a predetermined time period may be configured by a user.

Figure 6:
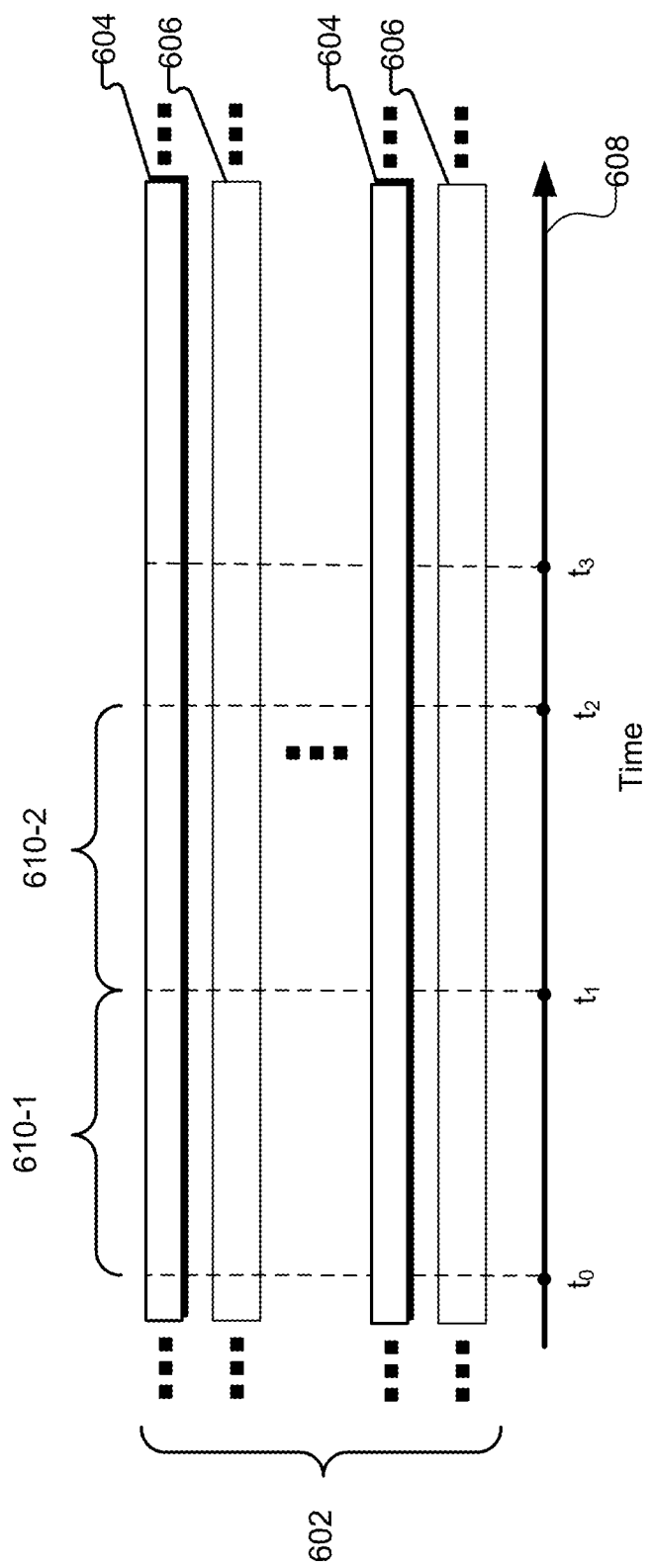
FIG. 6 illustrates another exemplary time period for identifying a trending topic associated with a plurality of media content streams according to principles described herein.

In additional or alternative examples, the predetermined time period may be a periodic interval of a set duration. FIG. 6 illustrates an exemplary plurality of media content streams 602 in which the predetermined time period is a periodic interval of a set duration. As shown, a plurality of media content streams 602 includes a plurality of media programs 604 and caption data 606 associated with the plurality of media programs 604 temporally aligned along a time axis 608. In the example of FIG. 6, each of predetermined time periods 610 (e.g., predetermined time periods 610-1 and 610-2) has a set duration. For instance, as shown in FIG. 6, when the duration is set to a length of time equal to a time period from time $t_0$ to time $t_1$ (e.g., 5 minutes), at the current time $t_1$ the system 100 detects one or more keywords included in caption data 606 during the predetermined time period 610-1 that begins with time $t_0$ and ends with current time $t_1$. The next predetermined time period 610-2 will begin after the prior predetermined time period 610-1 completes, and thus will begin at time $t_1$ and end at time $t_2$. When the current time has progressed to time $t_3$, but the duration of time from time $t_2$ to current time $t_0$ is less than the set duration, system 100 detects the keywords included in caption data stream 606 only during the most recently completed predetermined time period 610-2. The duration of the regularly repeating predetermined time period 610 may have any duration of time as may suit a particular implementation.

Figure 7:
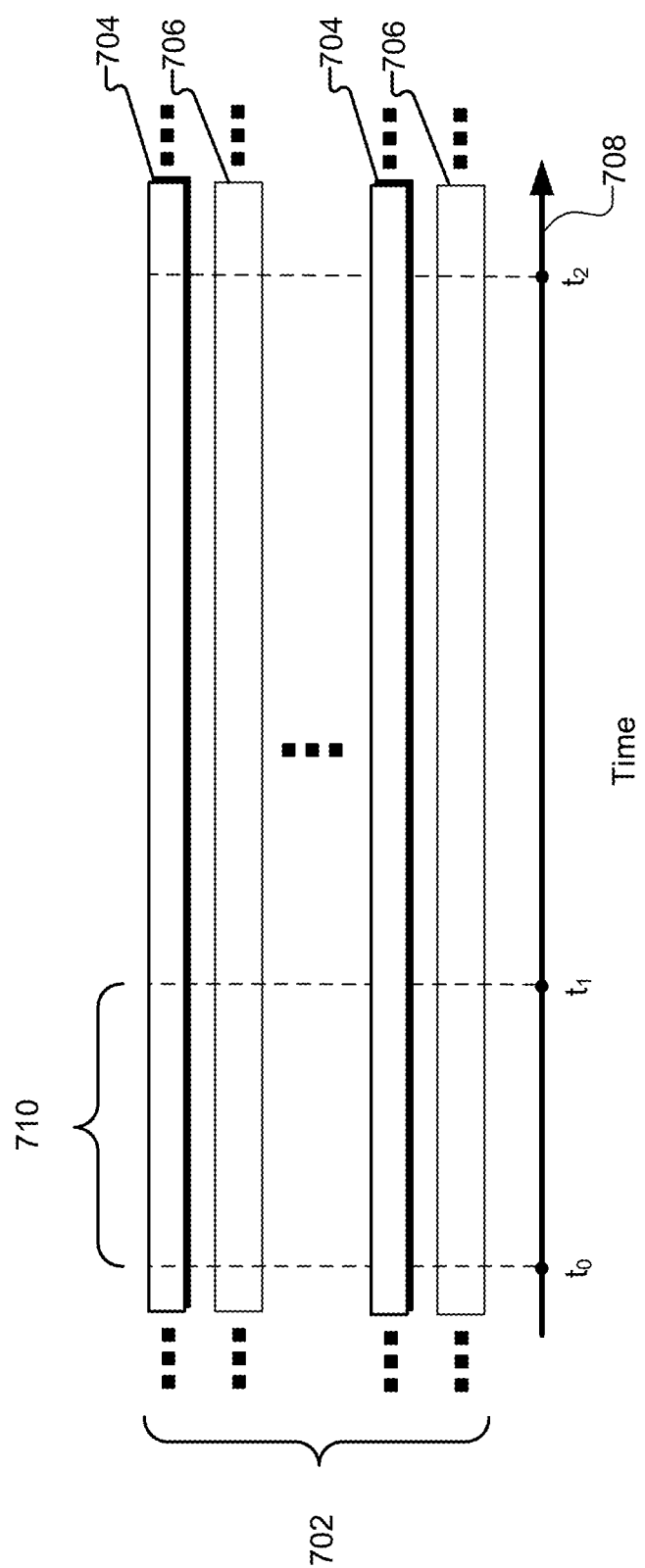
FIG. 7 illustrates another exemplary time period for identifying a trending topic associated with a plurality of media content streams according to principles described herein.

In additional or alternative examples, the predetermined time period may be a single, previously completed time period. In some examples, the previously completed predetermined time period may be specified by a user. FIG. 7 illustrates an exemplary identification of a trending topic in which the predetermined time period is a previously completed predetermined time period. As shown, a plurality of media content streams 702 include a plurality of media programs 704 and caption data 706 associated with the plurality of media programs 704 temporally aligned along a time axis 708. In the example of FIG. 7, a previously completed predetermined time period 710 ranges from time $t_0$ to time $t_1$ (e.g., a duration of one hour) and precedes current time $t_2$. At current time $t_2$ the system 100 detects one or more keywords included in caption data 706 during the previously completed predetermined time period 710. Processing facility 102 may detect one or more keywords included in caption data 706 during previously completed predetermined time period 710 in any manner described above and store data representative of the detected keywords and/or identified trending topics in a repository and refer to the repository to extract the identified keywords and/or trending topic for the predetermined time period 710. In additional or alternative examples, system 100 may store and index (based on one or more timestamps) caption data 706 when it is received and, in response to a user input to identify a trending topic for a previously completed time period 710, analyze the indexed caption data 706 associated with predetermined time period 710 to detect the one or more keywords.

Predetermined time period 710 may be set in any manner as may suit a particular implementation. In certain examples, a user, via a graphical user interface (e.g., a program guide menu) may specify a start and end time of predetermined time period 710. For instance, a user may desire to know what topics were trending two days earlier during prime time, and thus may specify time period 710 to be Tuesday from 7:00 pm to 9:00 pm.

Data representative of the identified trending topic may be stored in storage facility 104 and used by processing facility 102 to identify a media program clip associated with the trending topic. Processing facility 102 may identify a media program clip associated with the trending topic in any suitable manner.

For example, processing facility 102 may identify a media program clip associated with the trending topic based on a comparison of data representative of the trending topic with data included in a media content stream, such as caption data included in the media content stream or metadata (e.g., electronic program guide metadata) included in the media content stream. For instance, processing facility 102 may detect, within caption data included in a media content stream, one or more keywords associated with the trending topic. Keywords associated with the trending topic may be detected in any suitable manner, including any of the ways described herein. For example, processing facility 102 may detect an occurrence of one or more keywords associated with the trending topic in caption data associated with a media program. Based on the detection of the one or more keywords associated with the trending topic, processing facility 102 may designate a portion of the media program that includes the one or more keywords as the media program clip associated with the trending topic.

Figure 8:
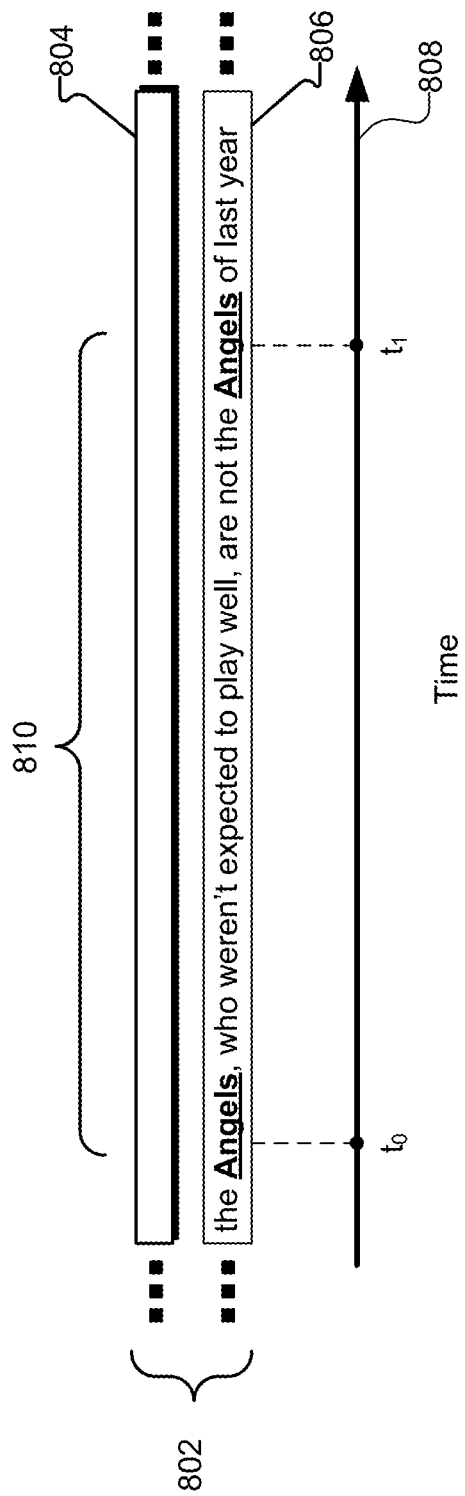
FIG. 8 illustrates an exemplary media program clip associated with a trending topic according to principles described herein.

To illustrate, FIG. 8 shows an exemplary media content stream 802, which includes a media program 804 and caption data 806 temporally aligned along a time axis 808. In the example of FIG. 8, processing facility 102 detects occurrences of the keywords "Angels", which are keywords associated with a previously identified trending topic ("Angels"), at times $t_0$ and $t_1$. For illustrative purposes, these keywords are bolded and underlined in FIG. 8. As indicated by the vertical dashed lines, the times at which the keywords occur (i.e., times $t_0$ and $t_1$) each correspond to a particular timestamp within media program 804. As a result, processing facility 102 may determine that the portion of media program 804 that includes keywords is a media program clip 810 associated with the trending topic. Exemplary manners in which the boundaries of media program clip 810 may be determined will be described below.

In some examples, keywords associated with the trending topic may be those words included in caption data 806 that satisfy a trending topic matching rule. For example, the keyword matching rule may include a keyword frequency counting rule, keyword clustering rule, and/or a topic detection model rule (e.g., a rule based on LDA). For instance, words included in caption data may be determined to be keywords associated with the trending topic if they occur in a specified frequency (e.g., a predetermined number of occurrences per total words in the caption data or per unit of time). If the words do not occur with the minimum frequency specified by a keyword frequency counting rule, the words, although identical to the identified trending topic, may not be detected as keywords associated with the trending topic. In certain examples, the keyword matching rule may be based on, or the same as, the text analysis technique used to identify the trending topic based on the detected keywords (e.g., have a same or similar frequency count as the keywords detected during the predetermined time period in the plurality of media programs, have a same or similar clustering, and/or satisfy a LDA analysis).

To illustrate, FIG. 8 shows that caption data 806 includes keywords in addition to words that are not associated with the trending topic. Processing facility 102 may compare words included in caption data 806 with data representative of the trending topic and determine if any of the words included in caption data 806 match the trending topic, i.e., satisfy the trending topic matching rule. For example, processing facility 102 may detect that the word "Angels" is included twice in caption data 806 and determine that this word occurs with a minimum frequency (e.g., two occurrences per fifty words), satisfies a clustering rule, and/or satisfies a topic detection model rule. Processing facility 102 may accordingly determine that the word "Angels" is associated with the trending topic. Processing facility 102 may determine that the other words included in caption data 806 are not associated with the trending topic and/or do not satisfy any of the trending topic matching rules. In this way, processing facility 102 may accurately identify a media program clip that is associated with the trending topic while minimizing the likelihood of identifying a media program clip that is not associated with the trending topic.

To further provide accurate identification of a media program clip associated with the trending topic, processing facility 102 may further identify the media program clip based on one or more filters. To illustrate, caption data included within a media content stream may include words that are similar or identical to the keywords associated with the trending topic, but are nevertheless unrelated to the keywords associated with the trending topic. For example, if the trending topic is "Angels," a media program having a religious subject (e.g., a documentary about the Bible) may also include the words "angels" within associated caption data and may otherwise satisfy the trending topic matching rule. To prevent identification of a media program clip that is not associated with the trending topic, processing facility 102 may receive and/or apply one or more filter rules for identifying the media program clip associated with the trending topic. The filter rules may be created and applied in any suitable manner. In some examples, the filter rules may be based on the context surrounding a mention of a trending topic, as determined by a distance of the topic from topic clusters or by anomaly detection. Additionally or alternatively, the filter rules may be any of the filters described above for identifying a trending topic.

In further examples, processing facility 102 may further identify the media program clip associated with the trending topic based on one or more attributes associated with a user profile, as described above. For example, processing facility 102 may identify the media program clip for a given user based on the user's behavior, such as viewing history, program guide browsing history, and/or social media preferences and history. In this way, processing facility may identify media program clips that are calculated to be of interest to the user.

Processing facility 102 may determine a start timestamp and an end timestamp of the media program clip 810 in any suitable manner. For example, the start timestamp and end timestamp may be based on timestamps associated with keywords detected within the caption data 806. For instance, in the illustrated example of FIG. 8, processing facility 102 may determine a start timestamp of the media program clip 810 to be the timestamp of the first detected keyword (i.e., "Angels" at time $t_0$) associated with the trending topic and may determine an end timestamp of the media program clip 810 to be the timestamp of the last detected keyword (i.e., "Angels" at time $t_1$) associated with the trending topic. In the illustrated example, processing facility 102 may designate the portion defined by the start timestamp and end timestamp as the media program clip 810.

In additional or alternative examples, processing facility 102 may define the start timestamp of the media program clip 810 associated with the trending topic by a first temporal position within media program 804 that temporally precedes the timestamp associated with the first detected keyword by a first predetermined amount of time and a second temporal position within media program 804 that temporally follows the temporal position associated with the last detected keyword by a second predetermined amount of time. These amounts of time may be specified by a user and/or automatically determined by system processing facility 102.

To illustrate, a user may specify that the first temporal position (i.e., the beginning of media program clip 810) is to be ten seconds (or any other amount of time) prior to an occurrence of the first detected keyword detected in caption data 806 (i.e., the keyword "Angels" at time $t_0$). Likewise, the user may specify that the second temporal position (i.e., the end of media program clip 810) is to be sixty seconds (or any other amount of time) after an occurrence of the last detected keyword in caption data 806 (i.e., the keyword "Angels" at time $t_1$).

In additional or alternative examples, the first temporal position associated with media program clip 810 (i.e., the beginning of the clip) may be defined to correspond to a beginning time of media program 804. Likewise, the second temporal position associated with media program clip 810 (i.e., the end of the media program clip) may be defined to correspond to an ending time of media program 804.

In additional or alternative examples, processing facility 102 may modify the start timestamp and/or end timestamp of the media program clip 810 to coincide with one or more identifiable points within media program 804. For instance, processing facility 102 may modify the start timestamp and/or the end timestamp to coincide with a scene change, hard cut, fade-in, fade-out, audio gap, video gap, advertising break, or other attribute of media program 804. In further examples, such as in a cloud-based DVR service, processing facility 102 may track where other users start and/or stop a presentation of a portion of the media program and determine a common start and/or end point for the portion of the media program. Processing facility 102 may modify the start timestamp and/or end timestamp of the media program clip 810 to coincide with the common start and/or end points tracked by processing facility 102.

As shown in FIG. 8, media program clip 810 is a portion of media program 804 included in media content stream 802. In some examples, media content stream 802 may be included in the plurality of media content streams (e.g., media content streams 402 as shown in FIG. 4) that are monitored and analyzed to identify the trending topic. In other examples, media content stream 802 may not be included in the plurality of media content streams (e.g., media content streams 402 as shown in FIG. 4) that are analyzed to identify the trending topic. For example, media program 804 in which media program clip 810 is included may be excluded from the plurality of media programs (e.g., media programs 404 as shown in FIG. 4) by a filter rule for identifying the trending topic. Additionally or alternatively, media program 804 may be previously recorded locally to a media content processing device and/or to a cloud-based DVR service, such that media content stream 802 is received prior to system 100 receiving the plurality of media content streams (e.g., media content streams 402 as shown in FIG. 4) that are analyzed to identify the trending topic.

In certain examples, media program clips associated with the trending topic may also be identified by first processing incoming media content streams to generate a plurality of media program clips, and then determining that a media program clip is associated with the trending topic. To illustrate, when processing facility 102 receives a plurality of media content streams (e.g., media content streams 208 shown in FIG. 2), processing facility 102 may identify a plurality of media program clips associated with the plurality of media content streams. The media program clips may be identified in any suitable manner. For example, a start point and an end point of the media program clips may be based on timestamps associated with one or more identifiable points included in the media program, as described herein. Processing facility 102 may then index and store data (e.g., tag data, timestamp data, etc.) representative of the plurality of media program clips in storage facility 104. Processing facility 102 may then detect that a media program clip is associated with a trending topic in any suitable manner, including any of the ways described herein.

As described above, one or more of the processes described herein may be implemented by a local media content processing device. In some examples, a media content processing device (e.g., a set-top box or DVR device) may identify a trending topic associated with a plurality of media programs recorded to a local storage facility associated with the media content processing device. Additionally or alternatively, system 100 may transmit data representative of an identified trending topic to a local media content processing device, and the local media content processing device may then identify a media program clip associated with the trending topic and recorded to a local storage facility associated with the local media content processing device.

Subsequent to identifying a media program clip associated with the trending topic, processing facility 102 may recommend the media program clip for access by a user of a media content processing device. Processing facility 102 may recommend the media program clip for access by a user in any suitable manner. For example, system 100 may provide a graphical user interface ("GUI") that provides a recommendation of the media program clip.

FIGS. 9-15 illustrate exemplary GUIs associated with recommending and accessing a media program clip associated with a trending topic. It will be recognized that the GUIs shown in FIGS. 9-15 are merely illustrative of the many different GUIs that may be presented to a user.

Figure 9:
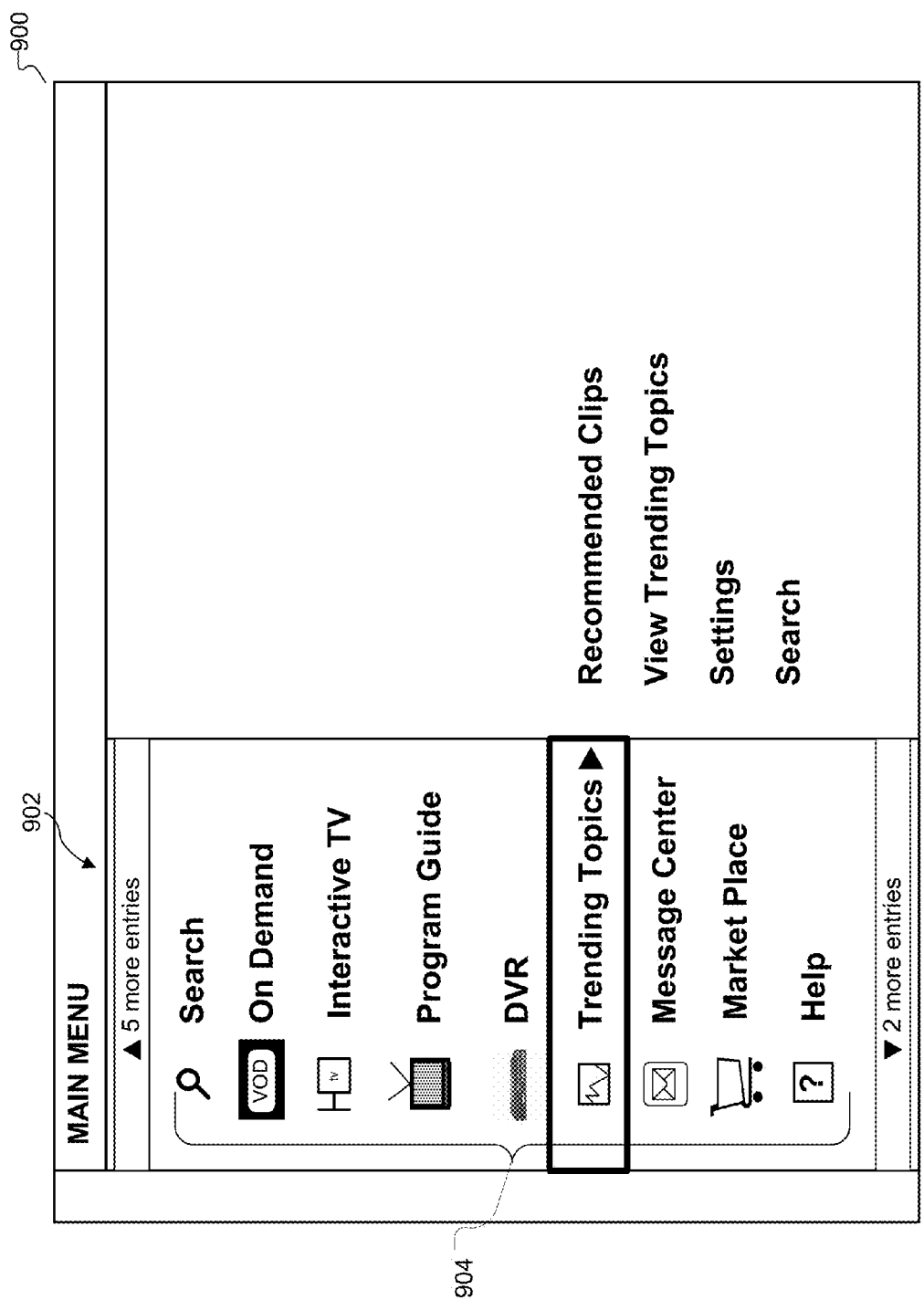
FIG. 9 illustrates a graphical user interface having an exemplary main menu view displayed therein according to principles described herein.

FIG. 9 illustrates an exemplary GUI 900 having a main menu view 902 displayed therein. As shown in FIG. 9, main menu view 902 may include a plurality of menu options 904. In response to a user selection of a "Trending Topics" menu option within the plurality of menu options 904, a trending topics main menu view may be provided for display.

Figure 10:
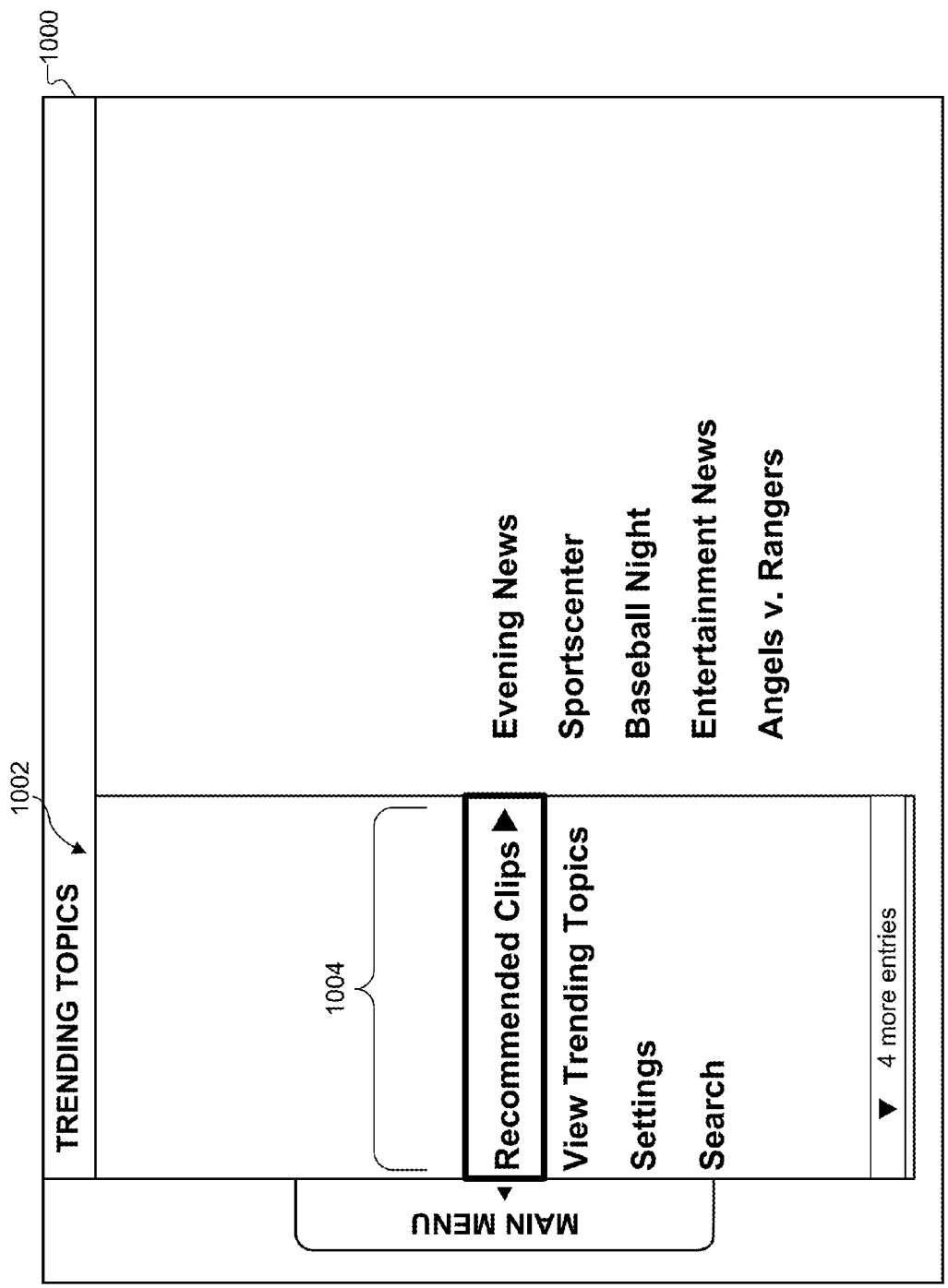
FIG. 10 illustrates a graphical user interface having an exemplary trending topics menu view displayed therein according to principles described herein.

For example, FIG. 10 illustrates a GUI 1000 having an exemplary trending topics menu view 1002 displayed therein. As shown in FIG. 10, trending topics menu view 1002 may include a plurality of menu options 1004 displayed therein. In response to a user selection of a "recommended clips" option within the menu options 1004, a recommended content menu view may be provided for display.

Figure 11:
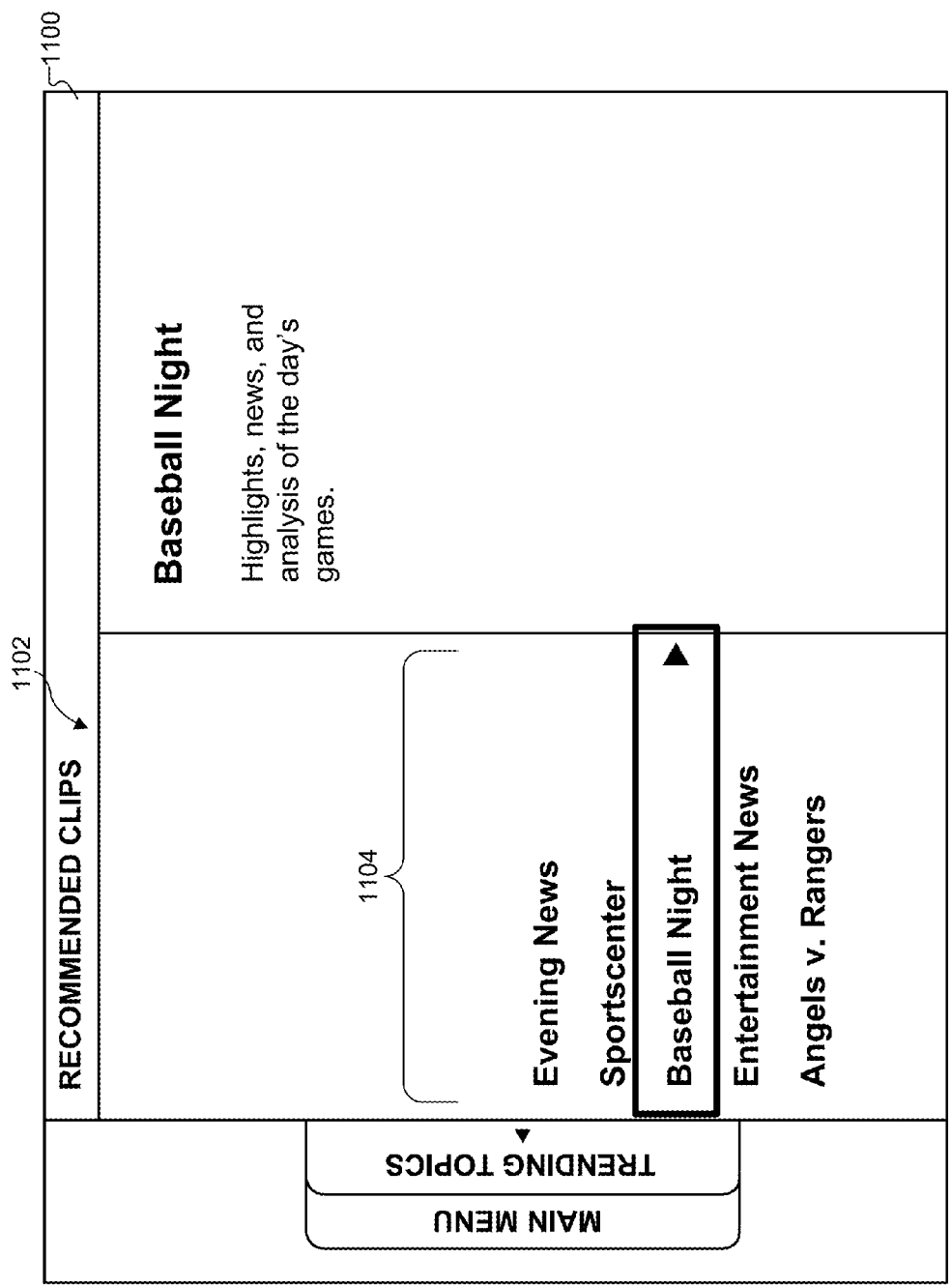
FIG. 11 illustrates a graphical user interface having an exemplary recommended content menu view displayed therein according to principles described herein.

For example, FIG. 11 illustrates a GUI 1100 having an exemplary recommended content menu view 1102 (i.e., a menu including data representative of recommended media program clips) displayed therein. As shown in FIG. 11, recommended content menu view 1102 may include graphical data representative of a plurality of recommended media program clips 1104 displayed therein. The recommended media program clips represented in recommended content menu view 1102 may comprise media program clips associated with a trending topic. In some examples, the recommended media program clips represented in recommended content menu view 1102 may further comprise media program clips that have been recorded by processing facility 102 to a local storage facility and/or a cloud-based DVR device.

Figure 12:
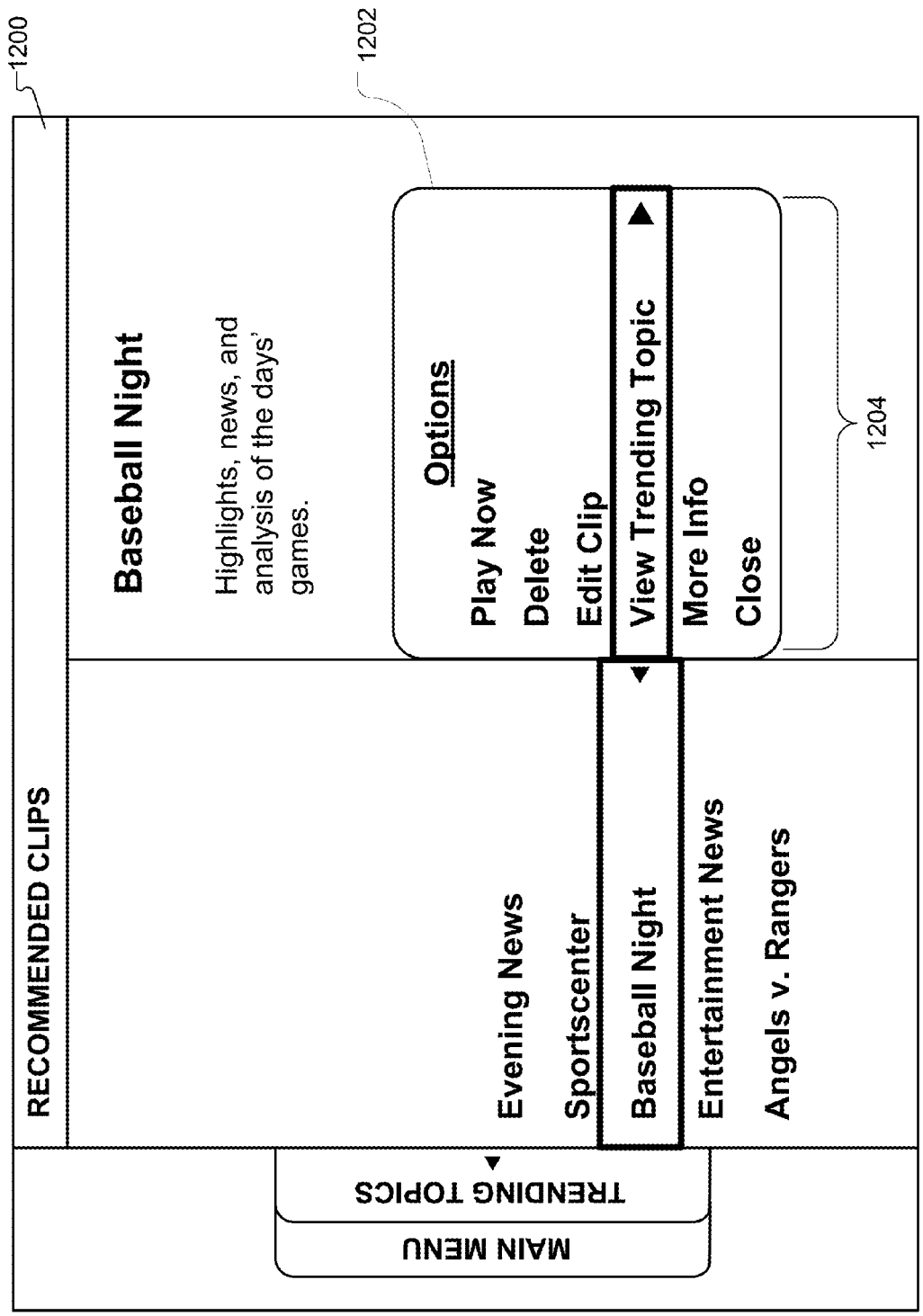
FIG. 12 illustrates a graphical user interface having exemplary selectable options associated with a selected media program clip displayed therein according to principles described herein.

In response to a user selection of a menu option associated with a media program clip 1104 in recommended content menu view 1102, a media program clip options view may be provided for display. For example, FIG. 12 illustrates a GUI 1200 having an exemplary media program clip options view 1202 displayed therein. As shown in FIG. 12, media program clip options view 1202 may include a plurality of options 1204 associated with the selected media content program clip (e.g., the media content program known as "Baseball Night"). In the illustrated example, the plurality of options 1204 includes a "play now" option, a "delete" option, an "edit clip" option (e.g., an option to edit a start and/or end timestamp of the media program clip), a "view trending topic" option, and a "close" option. In response to a user selection of the "play now" option shown in FIG. 12, the selected media program clip may be presented by the user's media content processing device.

Referring again to FIG. 10, trending topics main menu view 1002 may also include a "settings" option. In response to a user selection of the "settings" option within the menu options 1004, a settings menu view may be provided for display.

Figure 13:
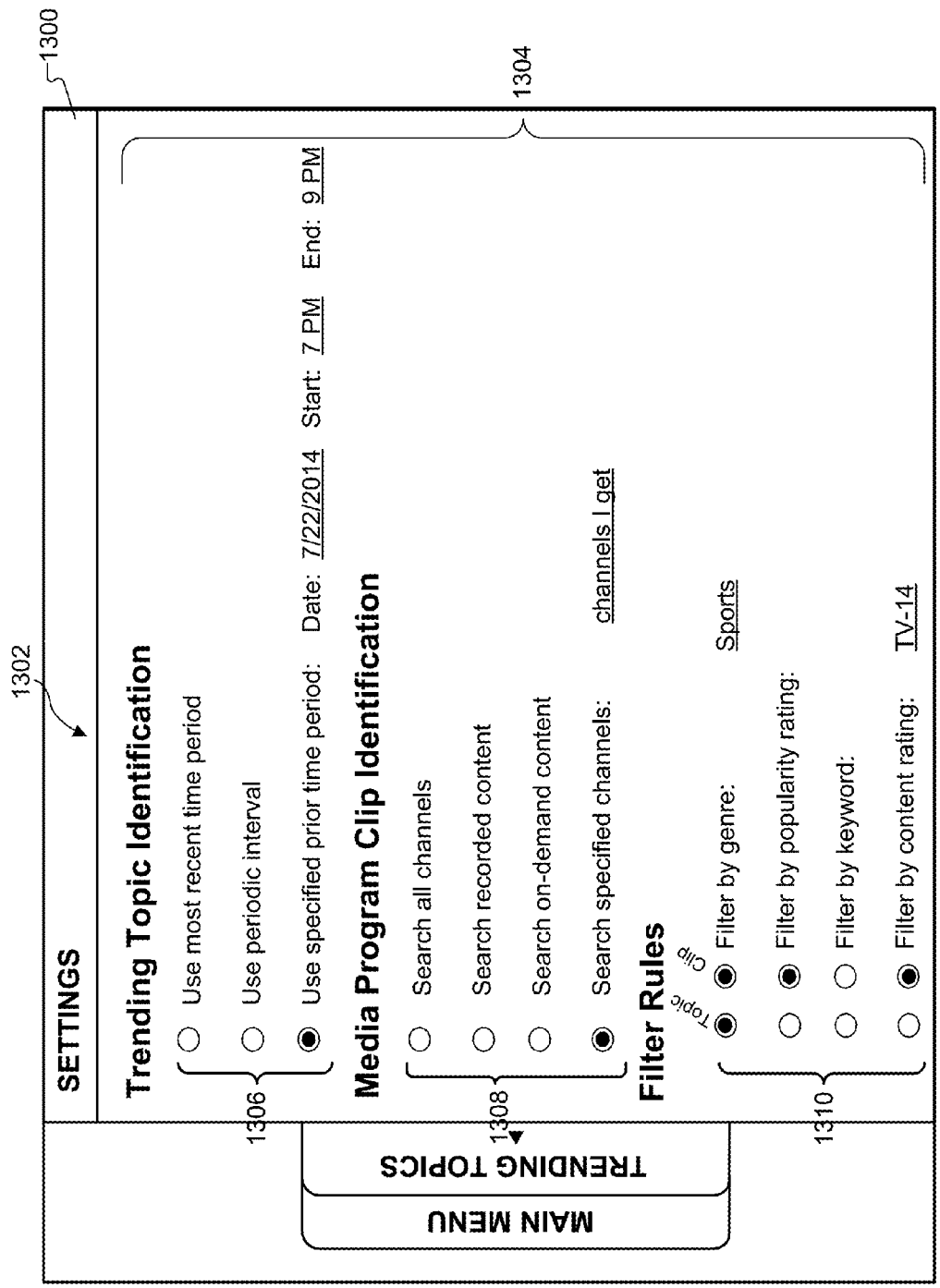
FIG. 13 illustrates a graphical user interface having an exemplary settings menu view displayed therein according to principles described herein.

For example, FIG. 13 illustrates a GUI 1300 having an exemplary settings menu view 1302 displayed therein. As shown in FIG. 13, settings menu view 1302 may include a plurality of settings options 1304 displayed therein. In the illustrated example, the plurality of settings options 1304 includes trending topic identification settings items 1306, media program clip identification settings items 1308, and filter rules settings items 1310. Via settings menu view 1302, a user may configure settings items and create filter rules in any manner described herein.

Returning again to FIG. 10, trending topics main menu view 1002 may also include a "view trending topics" option. In response to a user selection of the "view trending topics" option within the menu options 1004, a plurality of trending topics options may be provided for display.

Figure 14:
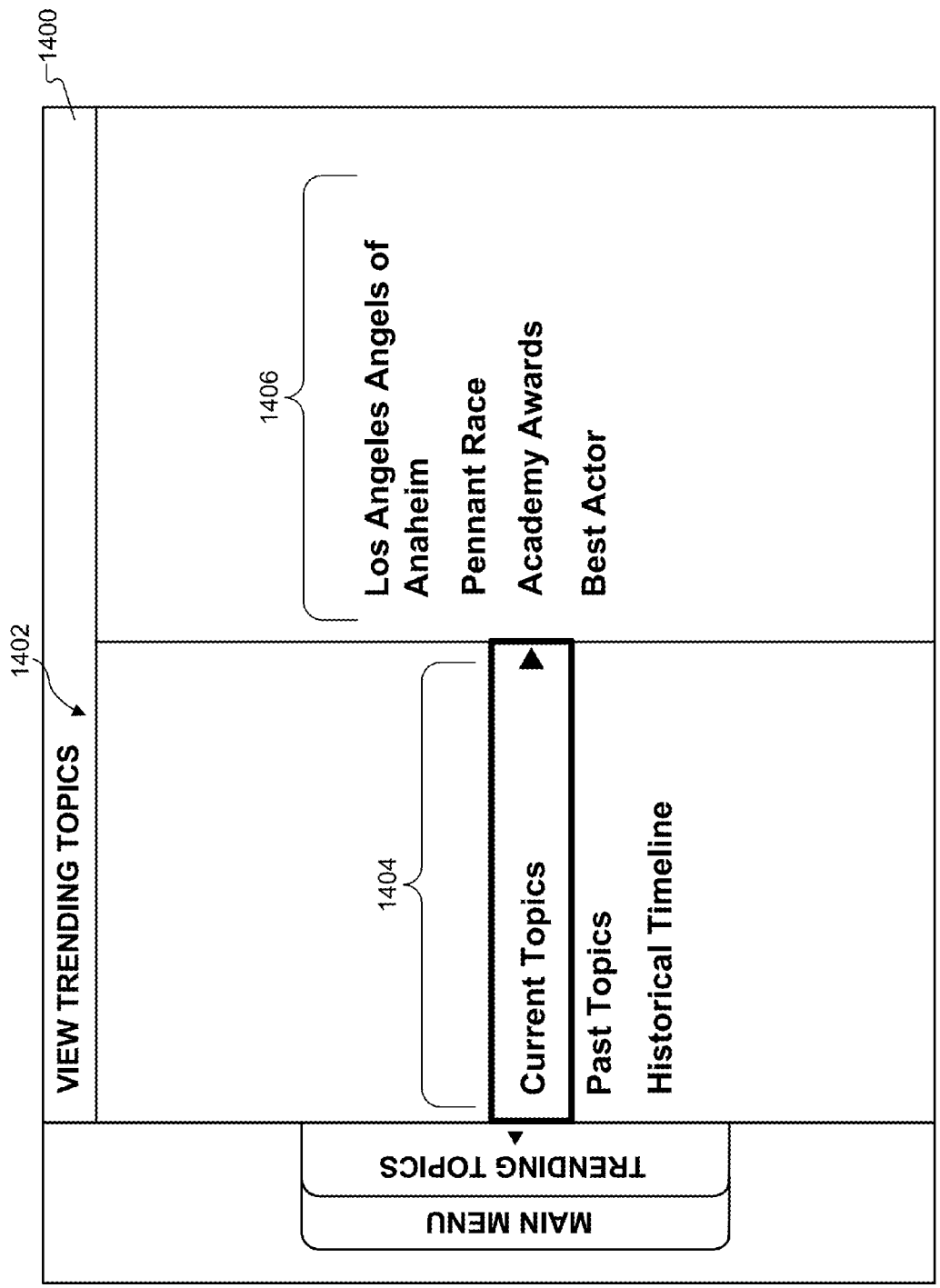
FIG. 14 illustrates a graphical user interface having an exemplary trending topics list displayed therein according to principles described herein.

For example, FIG. 14 illustrates a GUI 1400 having an exemplary trending topics menu view 1402. As shown in FIG. 14, trending topics menu view 1402 may include a plurality of trending topics options 1404 displayed therein. In the illustrated example, the plurality of options includes a "current topics" option, a "past topics" option, and a "historical timeline" option. In response to a user selecting the "current topics" option within trending topics menu view 1402, a list 1406 of currently trending topics may be provided for display.

In additional or alternative examples, processing facility 102 may recommend the media program clip for access by a user of a media content processing device by providing a notification of a media program clip for display by media content processing device. For example, when processing facility 102 identifies a trending topic associated with a plurality of media content streams currently being received by processing facility 102, processing facility 102 may notify a user of a media content processing device of a media program clip associated with the trending topic. In some examples, the media program clip may be a part of a media program included in a media content stream currently being received by processing facility 102 (e.g., by way of a current broadcast). Processing facility 102 may provide a notification of the media program clip having a start timestamp at the current time (i.e., the time of providing the notification), and may include a selectable option allowing a user to switch (e.g., tune) to the media content channel currently presenting the media program clip. If the media program is also being recorded to a media content processing device or a cloud-based DVR service, the notification may include a selectable option to view the media program clip in a time-shifted manner. For example, in response to a user selection of the selectable option, processing facility 102 may direct the media content processing device and/or the cloud-based DVR service to present the media program clip beginning at the start timestamp of the media program clip.

Figure 15:
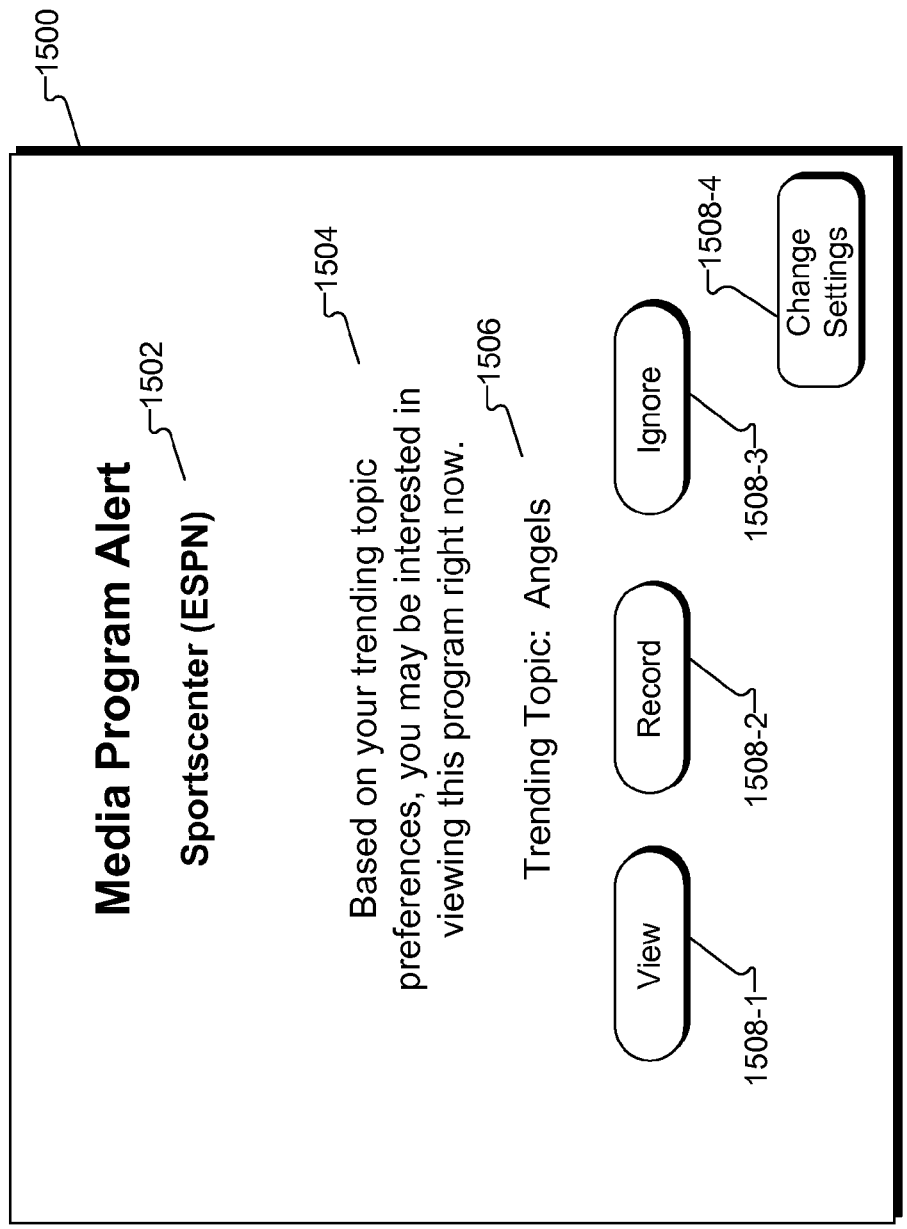
FIG. 15 illustrates an exemplary notification of a media program clip associated with a trending topic according to principles described herein.

To illustrate, FIG. 15 illustrates an exemplary notification 1500 that may be provided to the user in response to a media program clip associated with the trending topic being identified. Notification 1500 may be transmitted to a mobile device or to any other suitable media content processing device associated with the user and configured to process and display notification 1500. It will be recognized that notification 1500 is merely illustrative of the many different types of notifications that may be provided by system 1500 to a user in response to a media program clip associated with a trending topic being detected.

As shown, notification 1500 may include identifying information 1502 associated with the media program clip (e.g., the title of the media program, the name of the channel carrying media program, and/or any other identifying information associated with the media program clip), an explanation for the notification 1504, a description of the trending topic 1506, and one or more selectable options 1508 (e.g., options 1508-1 through 1508-4) associated with the media program clip. Notification 1500 may allow a user to view identifying information 1502 and/or trending topic 1506 and readily determine whether he or she desires to take any action with respect to the media program clip by selecting one or more of selectable options 1508. For example, the user may select option 1508-1 to tune to the media content channel carrying the media program clip and view the media program clip (e.g., in a time-shifted manner), select option 1508-2 to direct system 100 to record at least a portion of the media program clip, select option 1508-3 to ignore the media program clip, or select option 1508-4 to direct the user to a trending topics settings menu (e.g., trending topics settings menu 1302) to adjust settings, including notification settings.

In addition to using identified trending topics to identify and recommend media program clips associated with the trending topics, identified trending topics may also be used to identify information for commercial use (e.g., marketing, targeted advertising, etc.). For example, processing data 106 stored in storage facility 104 may include data representative of trending topics, which may further be tied to geographic regions, as well as any other demographic data. The identified trending topics may be used to select and present, within the media content streams received by processing facility 102, advertising content associated with the trending topics. For example, a media program may have a commercial break that includes an advertisement using a trending sports figure or actor to sell the product. Additionally or alternatively, a media program clip associated with the trending topic and recommended to a user for viewing may be an advertisement associated with the trending topic. For example, if "record heat wave" is a trending topic, media program clips comprising advertisements for air conditioning, ice cream, and the like may be identified and recommended to a user for viewing.

Figure 16:
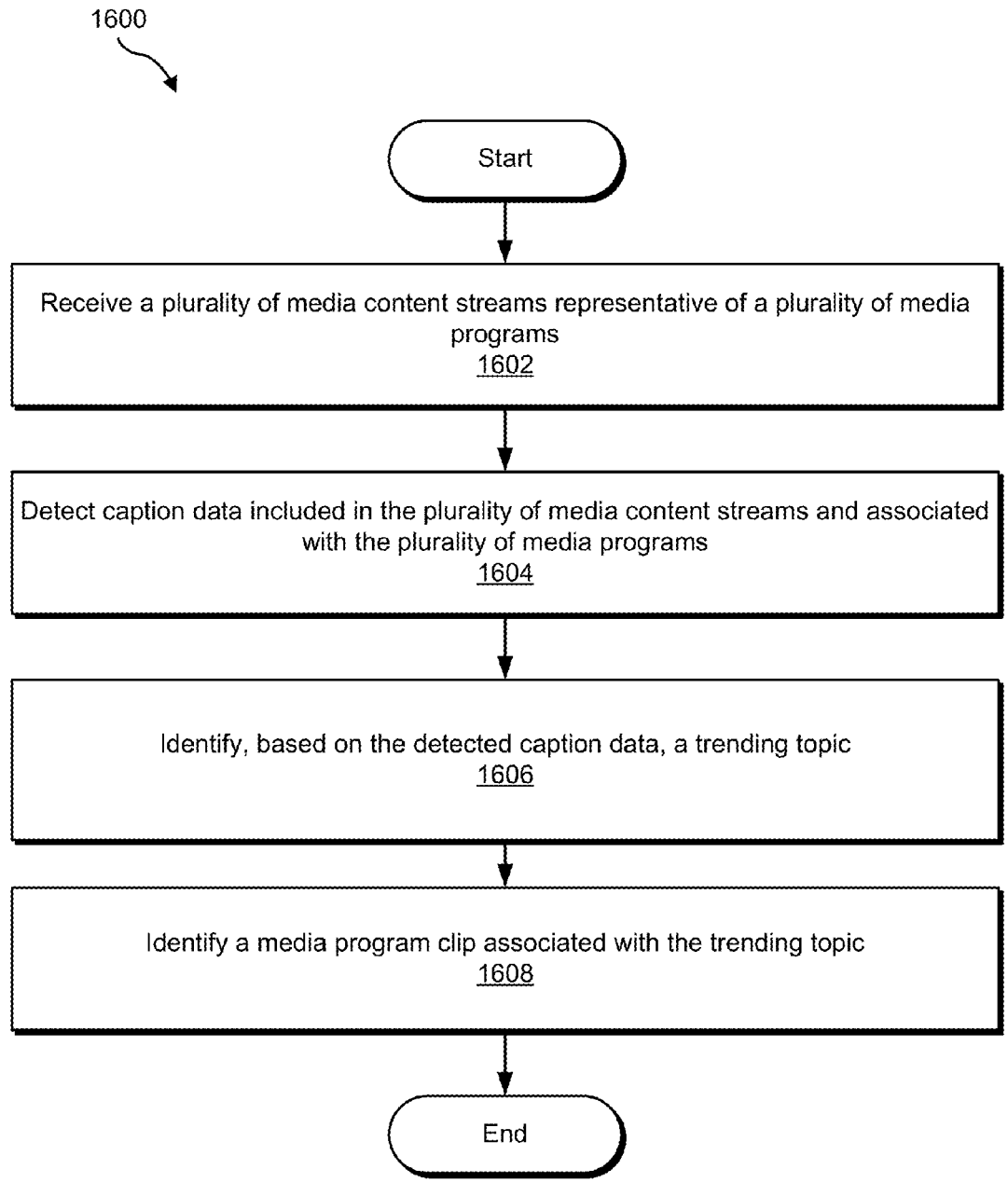
FIG. 16 illustrates an exemplary method of identifying a media program clip associated with a trending topic according to principles described herein.

FIG. 16 illustrates an exemplary method 1600 for identifying a media program clip associated with a trending topic. While FIG. 16 illustrates exemplary steps according to one embodiment, other embodiments may omit, add to, reorder, and/or modify any of the steps shown in FIG. 16. One or more of the steps shown in FIG. 16 may be performed by system 100 and/or any implementation thereof.

In step 1602, a media content trend analysis system receives a plurality of media content streams representative of a plurality of media programs. Step 1602 may be performed in any of the ways described herein.

In step 1604, the media content trend analysis system detects, during the receiving of the plurality of media content streams, caption data included in the plurality of media content streams and associated with the plurality of media programs. Step 1604 may be performed in any of the ways described herein.

In step 1606, the media content trend analysis system identifies, based on the detected caption data, a trending topic. Step 1606 may be performed in any of the ways described herein.

In step 1608, the media content trend analysis system identifies a media program clip associated with the trending topic. Step 1608 may be performed in any of the ways described herein.

Figure 17:
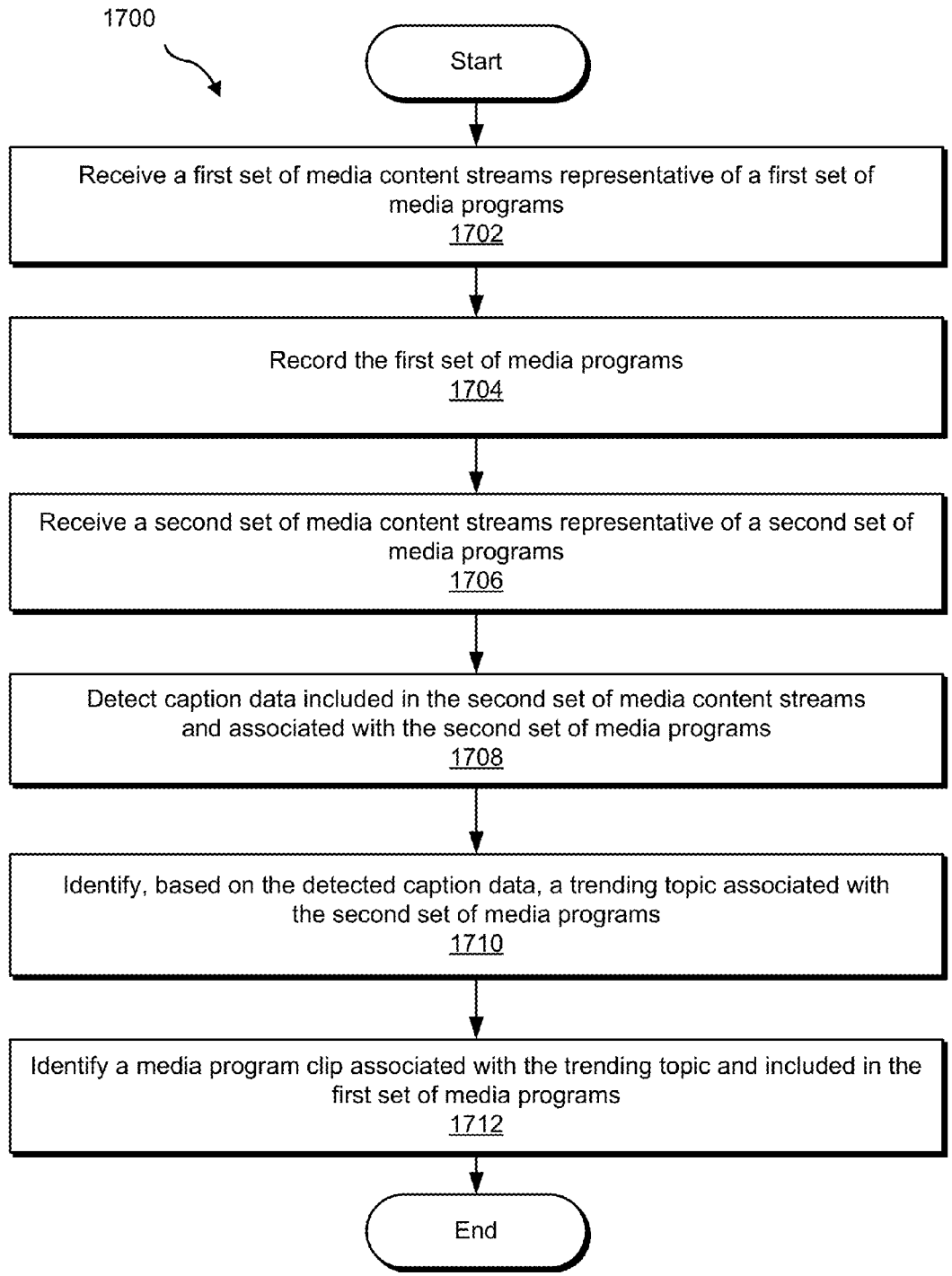
FIG. 17 illustrates another exemplary method of identifying a media program clip associated with a trending topic according to principles described herein.

FIG. 17 illustrates another exemplary method for identifying a media program clip associated with a trending topic according to principles described herein. While FIG. 17 illustrates exemplary steps according to one embodiment, other embodiments may omit, add to, reorder, and/or modify any of the steps shown in FIG. 17. One or more of the steps shown in FIG. 17 may be performed by system 100 and/or any implementation thereof.

In step 1702, a media content trend analysis system receives a first set of media content streams representative of a first set of media programs. Step 1702 may be performed in any of the ways described herein.

In step 1704, the media content trend analysis system records the first set of media content streams. Step 1704 may be performed in any of the ways described herein.

In step 1706, the media content trend analysis system receives a second set of media content streams representative of a second set of media programs. Step 1706 may be performed in any of the ways described herein.

In step 1708, the media content trend analysis system detects, during the receiving of the second set of media content streams, caption data included in the second set of media content streams and associated with the second set of media programs. Step 1708 may be performed in any of the ways described herein.

In step 1710, the media content trend analysis system identifies, based on the detected caption data, a trending topic associated with the second set of media programs. Step 1710 may be performed in any of the ways described herein.

In step 1712, the media content trend analysis system identifies a media program clip associated with the trending topic and included in the first set of media programs. Step 1712 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 18:
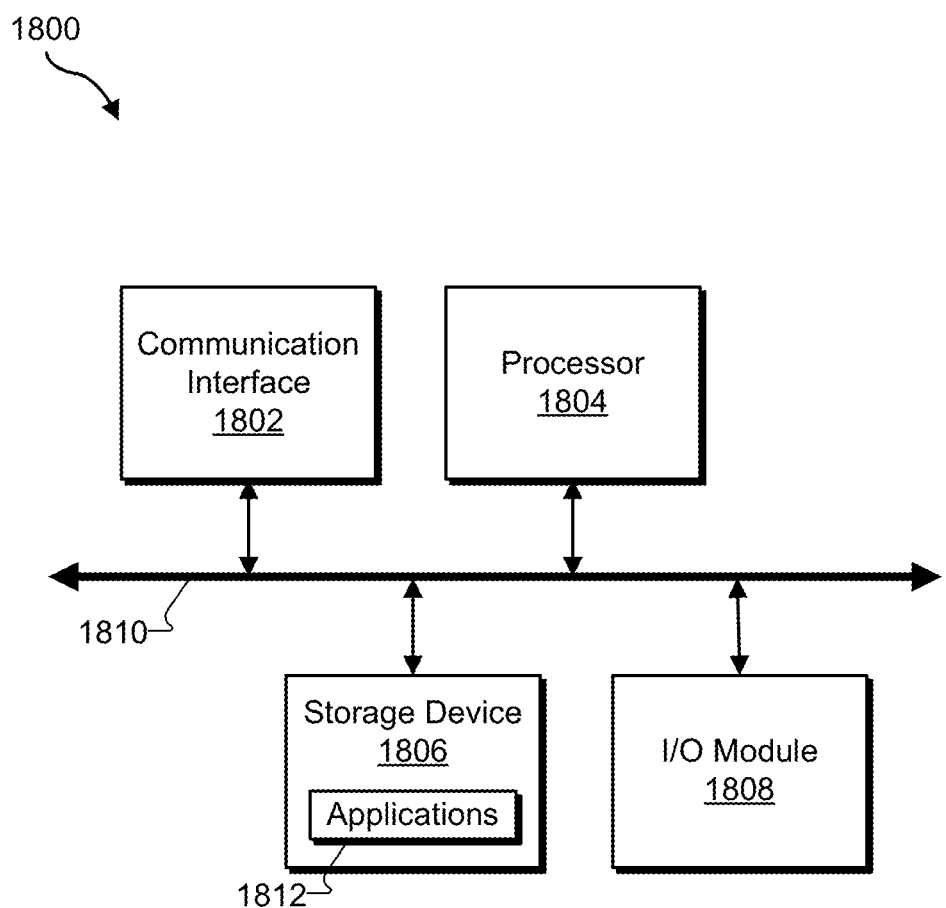
FIG. 18 illustrates an exemplary computing device according to principles described herein.

FIG. 18 illustrates an exemplary computing device 1800 that may be configured to perform one or more of the processes described herein. As shown in FIG. 18, computing device 1800 may include a communication interface 1802, a processor 1804, a storage device 1806, and an input/output ("I/O") module 1808 communicatively connected via a communication infrastructure 1810. While an exemplary computing device 1800 is shown in FIG. 18, the components illustrated in FIG. 18 are not intended to be limiting. Additional or alternative components may be used in other embodiments. Components of computing device 1800 shown in FIG. 18 will now be described in additional detail.

Communication interface 1802 may be configured to communicate with one or more computing devices. Examples of communication interface 1802 include, without limitation, a wired network interface (such as a network interface card), a wireless network interface (such as a wireless network interface card), a modem, an audio/video connection, and any other suitable interface.

Processor 1804 generally represents any type or form of processing unit capable of processing data or interpreting, executing, and/or directing execution of one or more of the instructions, processes, and/or operations described herein. Processor 1804 may direct execution of operations in accordance with one or more applications 1812 or other computer-executable instructions such as may be stored in storage device 1806 or another computer-readable medium.

Storage device 1806 may include one or more data storage media, devices, or configurations and may employ any type, form, and combination of data storage media and/or device. For example, storage device 1806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1806. For example, data representative of one or more executable applications 1812 configured to direct processor 1804 to perform any of the operations described herein may be stored within storage device 1806. In some examples, data may be arranged in one or more databases residing within storage device 1806.

I/O module 1808 may be configured to receive user input and provide user output and may include any hardware, firmware, software, or combination thereof supportive of input and output capabilities. For example, I/O module 1808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1800. For example, one or more applications 1812 residing within storage device 1806 may be configured to direct processor 1804 to perform one or more processes or functions associated with processing facility 102. Likewise, storage facility 104 may be implemented by or within storage device 1806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A computer-implemented method comprising:
  receiving, by a media content trend analysis system comprising at least one physical processor, a plurality of media content streams representative of a plurality of media programs;
  detecting, by the media content trend analysis system during the receiving of the plurality of media content streams, caption data included in the plurality of media content streams and associated with the plurality of media programs;
  identifying, by the media content trend analysis system based on the detected caption data, a trending topic; and
  identifying, by the media content trend analysis system, a media program clip associated with the trending topic, the identifying of the media program clip associated with the trending topic comprising:
    detecting, within caption data included in a media content stream representative of a media program, one or more keywords associated with the trending topic,
    identifying, within the media content stream based on the detected one or more keywords, a first timestamp corresponding to the one or more keywords associated with the trending topic and a second timestamp corresponding to the one or more keywords associated with the trending topic,
    determining a start timestamp based on the first timestamp and an end timestamp based on the second timestamp, and designating a portion of the media content stream defined by the start timestamp and the end timestamp as the media program clip associated with the trending topic.

2. The method of claim 1, wherein the identifying of the media program clip associated with the trending topic further comprises modifying at least one of the start timestamp and the end timestamp to a different point in the media content stream, the different point associated with at least one of a scene change, a hard cut, a fade-in, a fade-out, an audio gap, a video gap, and an advertising break in the media content stream.

3. The method of claim 1, wherein the media content stream is included in the plurality of media content streams.

4. The method of claim 1, wherein the media content stream is received prior to the receiving of the plurality of media content streams.

5. The method of claim 1, wherein the media content stream is received subsequent to the receiving of the plurality of media content streams.

6. The method of claim 1, further comprising:
recording, by a media content processing device, the media program clip to at least one of a local storage facility associated with the media content processing device and a network storage facility.

7. The method of claim 1, wherein:
the media program clip includes a first portion of a media program and excludes a second portion of the media program;
the first portion of the media program is associated with the trending topic; and
the second portion of the media program is not associated with the trending topic.

8. The method of claim 1, wherein the receiving of the plurality of media content streams comprises receiving the plurality of media content streams by way of a plurality of media content channels while the media programs are being broadcast.

9. The method of claim 1, wherein the identifying of the trending topic comprises:
detecting one or more keywords included in the caption data; and
identifying the trending topic based on the one or more keywords;
wherein the one or more keywords are each associated with a timestamp within a predetermined time range of a current time associated with the receiving of the plurality of media content streams.

10. The method of claim 9, wherein the identifying of the trending topic based on the set of keywords is performed in accordance with at least one of keyword frequency counting, keyword clustering, and a topic detection model.

11. The method of claim 9, wherein the detecting of the one or more keywords includes removing one or more noise words from the caption data to obtain the keywords.

12. The method of claim 1, further comprising:
receiving, by the media content trend analysis system, one or more filter rules;
wherein the identifying of the trending topic is further performed in accordance with the one or more filter rules.

13. The method of claim 1, further comprising recommending, by the media content trend analysis system, the media program clip for access by a user of a media content processing device.

14. The method of claim 13, wherein the recommending of the media program clip comprises providing, for display by the media content processing device, a graphical user interface including a display element representative of the media content clip.

15. The method of claim 14, wherein the graphical user interface further includes a selectable option for initiating a presentation of the media program clip by way of the media content processing device.

16. The method of claim 13, wherein the recommending of the media program clip includes providing, for display by the media content processing device, a notification of a current broadcast of the media program clip.

17. The method of claim 1, embodied as computer-executable instructions on at least one non-transitory computer-readable medium.

18. A computer-implemented method comprising:
receiving, by a media content trend analysis system comprising at least one physical processor, a first set of media content streams representative of a first set of media programs;
recording, by the media content trend analysis system, the first set of media content streams;
receiving, by the media content trend analysis system, a second set of media content streams representative of a second set of media programs;
detecting, by the media content trend analysis system during the receiving of the second set of media content streams, caption data included in the second set of media content streams and associated with the second set of media programs;
identifying, by the media content trend analysis system based on the detected caption data, a trending topic; and
identifying, by the media content trend analysis system, a media program clip associated with the trending topic and included in the first set of media programs, the identifying of the media program clip associated with the trending topic comprising:
detecting, within caption data included in a media content stream representative of a media program and included in the first set of media content streams, one or more keywords associated with the trending topic,
identifying, within the media content stream based on the detected one or more keywords, a first timestamp corresponding to the one or more keywords associated with the trending topic and a second timestamp corresponding to the one or more keywords associated with the trending topic,
determining a start timestamp based on the first timestamp and an end timestamp based on the second timestamp, and
designating a portion of the media content stream defined by the start timestamp and the end timestamp as the media program clip associated with the trending topic.

19. The method of claim 18, wherein the recording of the first set of media content streams comprises recording the first set of media content streams to a cloud-based digital video recording ("DVR") device.

20. The method of claim 18, further comprising recommending, by the media content trend analysis system, the media program clip associated with the trending topic for access by a user of a media content processing device.

21. A system comprising:
at least one computing device including at least one physical processor and that:
receives a plurality of media content streams representative of a plurality of media programs;

detects, during the receiving of the plurality of media content streams, caption data included in the plurality of media content streams and associated with the plurality of media programs;

identifies, based on the detected caption data, a trending topic; and identifies a media program clip associated with the trending topic by:
- detecting, within caption data included in a media content stream representative of a media program, one or more keywords associated with the trending topic,
- identifying, within the media content stream based on the detected one or more keywords, a first timestamp corresponding to the one or more keywords associated with the trending topic and a second timestamp corresponding to the one or more keywords associated with the trending topic,
- determining a start timestamp based on the first timestamp and an end timestamp based on the second timestamp, and
- designating a portion of the media content stream defined by the start timestamp and the end timestamp as the media program clip associated with the trending topic.

* * * * *